US012667950B2

(12) United States Patent

Kuroyanagi et al.

(10) Patent No.: US 12,667,950 B2
(45) Date of Patent: Jun. 30, 2026

(54) DRIVER DRILL AND HAMMER DRIVER DRILL

(71) Applicant: MAKITA CORPORATION, Anjo (JP)

(72) Inventors: Takao Kuroyanagi, Anjo (JP); Taisei Osawa, Anjo (JP); Tetsuya Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/817,599

(22) Filed: Aug. 28, 2024

(65) Prior Publication Data

US 2025/0073882 A1 Mar. 6, 2025

(30) Foreign Application Priority Data

Sep. 1, 2023 (JP) ................................ 2023-142415

(51) Int. Cl.

*B25F 5/00* (2006.01)
*B25B 21/02* (2006.01)
*B25F 5/02* (2006.01)

(52) U.S. Cl.

CPC ............ *B25F 5/001* (2013.01); *B25B 21/026* (2013.01); *B25D 2250/041* (2013.01); *B25F 5/026* (2013.01)

(58) Field of Classification Search

CPC ..... B23B 45/001; B23B 45/003; B23B 45/02; B25B 21/026; B25D 2250/041; B25F 5/001; B25F 5/02; B25F 5/026; H01R 13/533; H01R 31/08; H02K 7/147; H01B 7/0045

See application file for complete search history.

(56) References Cited

U.S. PATENT DOCUMENTS

| | | | | | |
|---|---|---|---|---|---|
| 3,710,154 | A * | 1/1973 | Schilling | B23B 45/02 | 310/50 |
| 4,487,270 | A * | 12/1984 | Huber | B23B 45/02 | 74/412 TA |
| 4,629,823 | A * | 12/1986 | Fushiya | H05K 5/00 | 174/559 |
| 4,991,472 | A * | 2/1991 | Hollingsworth | B25B 21/02 | 81/464 |

(Continued)

FOREIGN PATENT DOCUMENTS

| | | | | |
|---|---|---|---|---|
| CA | 2298750 A1 * | 6/2001 | C10M 101/02 |
| CN | 2378161 Y * | 5/2000 | |

(Continued)

*Primary Examiner* — Robert F Long
*Assistant Examiner* — Eduardo R Ferrero
(74) *Attorney, Agent, or Firm* — Oliff PLC

(57) ABSTRACT

A driver drill may include: a motor; an output part provided forward of the motor and driven by the motor; a speed reduction mechanism disposed between the motor and the output part; a motor bracket disposed between the motor and the speed reduction mechanism; a housing that houses the motor and the motor bracket; an element provided above the motor or the speed reduction mechanism; and a lead wire connected to the element and extending more downward than the motor or the speed reduction mechanism. The lead wire may be sandwiched between the housing and the motor bracket.

12 Claims, 21 Drawing Sheets

(56) References Cited

U.S. PATENT DOCUMENTS

| | | | | | |
|---|---|---|---|---|---|
| 5,136,197 | A | * | 8/1992 | Hallett | B23B 45/02<br>310/78 |
| 6,144,121 | A | * | 11/2000 | Ishida | B25F 5/008<br>310/47 |
| 6,536,536 | B1 | * | 3/2003 | Gass | B25F 5/021<br>173/171 |
| 7,021,400 | B2 | * | 4/2006 | Oretti | B23B 31/123<br>173/29 |
| 7,498,526 | B2 | * | 3/2009 | Lohr | B25B 23/18<br>200/522 |
| 7,900,715 | B2 | * | 3/2011 | Chen | B25F 5/001 |
| 7,980,324 | B2 | * | 7/2011 | Bixler | B25F 5/02 |
| 9,573,264 | B2 | * | 2/2017 | Schaal | B25F 5/001 |
| 9,954,418 | B2 | * | 4/2018 | Kawakami | B24B 23/028 |
| 10,478,950 | B2 | * | 11/2019 | Nagasaka | B25F 5/02 |
| 11,007,632 | B2 | * | 5/2021 | Aoki | B25F 5/006 |
| 12,179,319 | B2 | * | 12/2024 | Kamiya | B25B 21/02 |
| 12,350,809 | B2 | * | 7/2025 | Sasaki | H02K 7/145 |
| 2004/0011544 | A1 | * | 1/2004 | Cooper | B25F 5/02<br>173/217 |
| 2005/0085124 | A1 | * | 4/2005 | Kristen | B25D 17/24<br>439/577 |
| 2008/0025017 | A1 | * | 1/2008 | Tadokoro | B25F 5/021<br>362/119 |
| 2012/0010043 | A1 | * | 1/2012 | Inagaki | B23B 45/008<br>477/20 |
| 2012/0169256 | A1 | * | 7/2012 | Suda | B25B 21/00<br>318/17 |
| 2014/0008090 | A1 | * | 1/2014 | Kokinelis | B25F 5/02<br>29/428 |
| 2014/0014385 | A1 | * | 1/2014 | Kosugi | B25F 5/02<br>173/217 |
| 2014/0190717 | A1 | * | 7/2014 | Simpson | G09F 23/00<br>29/428 |
| 2014/0231114 | A1 | * | 8/2014 | Schenk | B23B 45/02<br>173/20 |
| 2015/0041164 | A1 | * | 2/2015 | Sergyeyenko | B25B 23/147<br>173/176 |
| 2015/0122521 | A1 | * | 5/2015 | Chen | B25B 21/02<br>173/1 |
| 2016/0311094 | A1 | * | 10/2016 | Mergener | B25B 23/1475 |
| 2016/0354888 | A1 | * | 12/2016 | Huber | B25F 5/001 |
| 2017/0083014 | A1 | * | 3/2017 | Conrad | G05B 19/425 |
| 2017/0214292 | A1 | * | 7/2017 | Nagahama | H02K 3/522 |
| 2017/0239801 | A1 | * | 8/2017 | Kondo | B25B 21/02 |
| 2017/0334054 | A1 | * | 11/2017 | Kamiya | H02P 29/032 |
| 2018/0215029 | A1 | * | 8/2018 | Steckel | B25B 21/00 |
| 2019/0280558 | A1 | * | 9/2019 | Hamano | B65B 13/187 |
| 2020/0008300 | A1 | * | 1/2020 | Lewis | H05K 1/181 |
| 2020/0023501 | A1 | * | 1/2020 | Bandy | B25B 21/02 |
| 2020/0094392 | A1 | * | 3/2020 | Larsen | B25F 5/02 |
| 2020/0101587 | A1 | * | 4/2020 | Niwa | H02K 21/16 |
| 2020/0195076 | A1 | * | 6/2020 | Naito | H02K 3/12 |
| 2021/0083543 | A1 | * | 3/2021 | Watanabe | H02K 11/215 |
| 2021/0296955 | A1 | * | 9/2021 | Yamada | H02K 3/28 |
| 2021/0331306 | A1 | | 10/2021 | Ito et al. | |
| 2021/0367473 | A1 | * | 11/2021 | Yoshimura | H02K 3/12 |
| 2022/0176534 | A1 | * | 6/2022 | Billings | B25B 21/02 |
| 2022/0190687 | A1 | * | 6/2022 | Fukuoka | B25B 23/18 |
| 2022/0193791 | A1 | * | 6/2022 | Kamiya | B23B 45/02 |
| 2022/0379455 | A1 | * | 12/2022 | Wakita | H02K 5/22 |
| 2023/0211489 | A1 | | 7/2023 | Ito et al. | |
| 2023/0330808 | A1 | * | 10/2023 | Numata | B24B 23/02 |
| 2023/0356382 | A1 | * | 11/2023 | Kamiya | B25F 5/026 |
| 2023/0415323 | A1 | * | 12/2023 | Ichikawa | B25D 17/24 |
| 2024/0416470 | A1 | * | 12/2024 | Iida | A47L 9/2836 |
| 2025/0289108 | A1 | * | 9/2025 | Suzuki | B25B 23/18 |

FOREIGN PATENT DOCUMENTS

| | | | | | |
|---|---|---|---|---|---|
| DE | 112019004600 | T5 | * | 6/2021 | B25F 5/02 |
| DE | 102023115014 | A1 | * | 1/2024 | B25F 5/006 |
| JP | h08309677 | | * | 11/1996 | |
| JP | 2008000877 | A | * | 1/2008 | |
| JP | 4391921 | B2 | * | 12/2009 | |
| JP | 2011016201 | A | * | 1/2011 | |
| JP | 4936213 | B2 | * | 5/2012 | B25F 5/021 |
| JP | 5170624 | B2 | * | 3/2013 | |
| JP | 5353516 | B2 | * | 11/2013 | B25F 5/021 |
| JP | 2017140668 | A | * | 8/2017 | B25F 5/02 |
| JP | 2021-171857 | A | | 11/2021 | |
| JP | 2025113596 | A | * | 8/2025 | B25D 17/00 |
| JP | 7765996 | B2 | * | 11/2025 | H02K 7/145 |
| WO | WO-2019130979 | A1 | * | 7/2019 | H02K 9/06 |

* cited by examiner

DRIVER DRILL AND HAMMER DRIVER DRILL

CROSS-REFERENCE TO RELATED APPLICATION(S)

The present application claims priority to and incorporates by reference the entire contents of Japanese Patent Application No. 2023-142415 filed in Japan on Sep. 1, 2023.

BACKGROUND OF THE INVENTION

The technology disclosed in the present specification relates to a driver drill and a hammer driver drill.

In the technical field related to a driver drill, a driver drill as disclosed in JP 2021-171857 A is known.

SUMMARY

One non-limiting object of the present technics to disclose techniques for appropriately holding a lead wire connected to an element while suppressing an increase in external dimension.

According to one aspect of the present teachings, a driver drill may include: a motor; an output part provided forward of the motor and driven by the motor; a speed reduction mechanism disposed between the motor and the output part; a motor bracket disposed between the motor and the speed reduction mechanism; a housing that houses the motor and the motor bracket; an element provided above the motor or the speed reduction mechanism; and a lead wire connected to the element and extending more downward than the motor or the speed reduction mechanism. The lead wire may be sandwiched between the housing and the motor bracket.

According to another aspect of the present teachings, a hammer driver drill may include: a motor; an output part provided forward of the motor and driven by the motor; a speed reduction mechanism disposed between the motor and the output part; a hammer mechanism provided between the speed reduction mechanism and the output part; a motor bracket disposed between the motor and the speed reduction mechanism; a housing that houses the motor and the motor bracket; an element provided above the motor or the speed reduction mechanism; and a lead wire connected to the element and extending more downward than the motor. The lead wire may be held by the motor bracket.

According to still another aspect of the present teachings, a hammer driver drill may include: a motor; an output part provided forward of the motor and driven by the motor; a speed reduction mechanism disposed between the motor and the output part; a hammer mechanism disposed between the output part and the speed reduction mechanism; a housing that houses the motor and the speed reduction mechanism; an element provided above the motor and the speed reduction mechanism; and a controller provided downward of the motor and connected to the element via a lead wire. A passage through which the lead wire passes may be provided between the motor and the speed reduction mechanism in a front-rear direction.

Additional aspects, objects, embodiments, and advantages of the present teachings will become apparent upon reading the following detailed description in view of the appended drawings and claims.

DETAILED DESCRIPTION OF THE EMBODIMENTS

Figure 1:
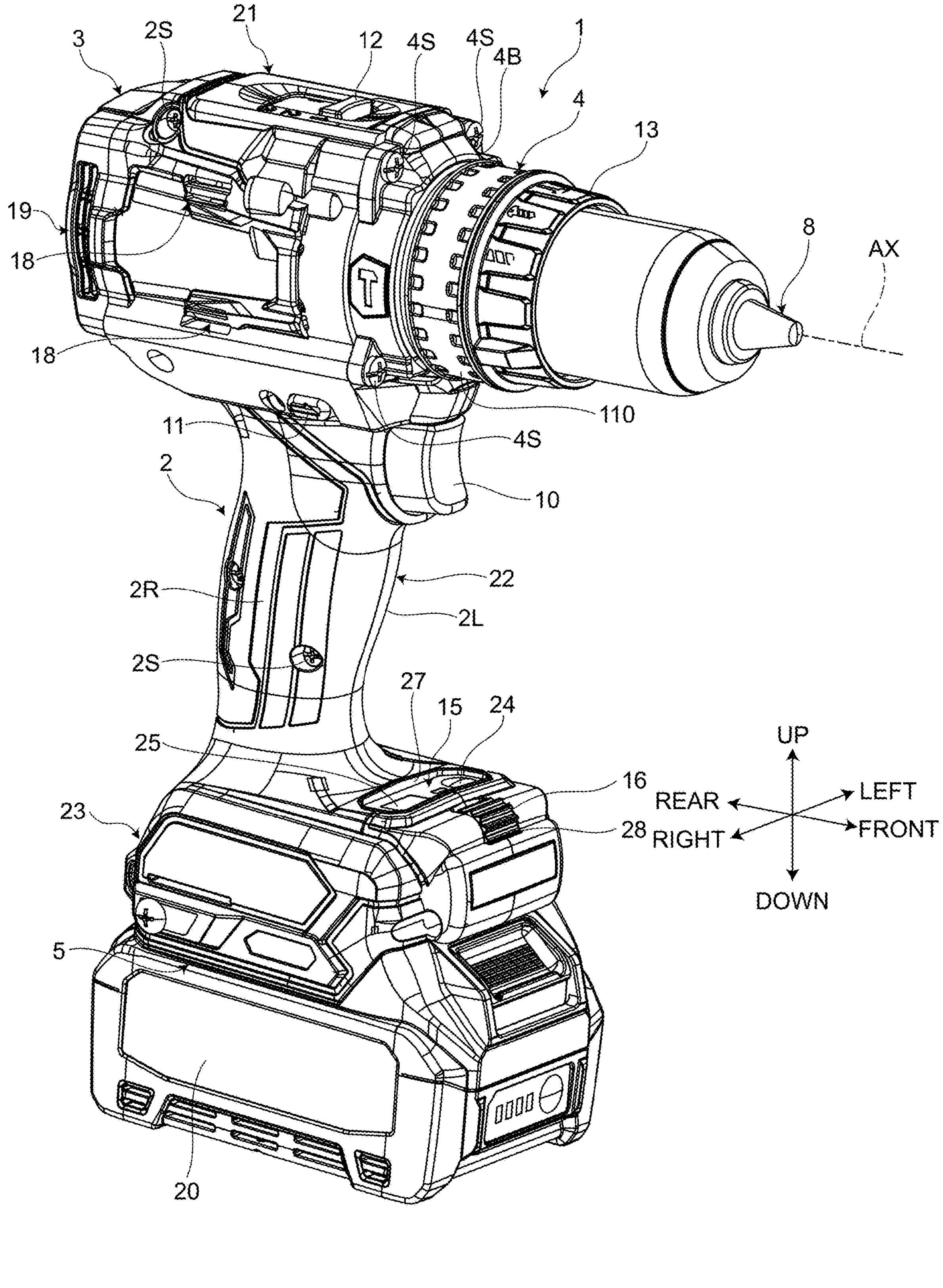
FIG. 1 is a front perspective view illustrating a driver drill according to an embodiment.

In one or more embodiments, the driver drill may include: a motor; an output part provided forward of the motor and driven by the motor; a speed reduction mechanism disposed between the motor and the output part; a motor bracket disposed between the motor and the speed reduction mechanism;

a housing that houses the motor and the motor bracket; an element provided above the motor or the speed reduction mechanism; and a lead wire connected to the element and extending more downward than the motor or the speed reduction mechanism. The lead wire may be sandwiched between the housing and the motor bracket.

With the above configuration, the lead wire connected to the element is appropriately held while suppressing an increase in the external dimension.

In one or more embodiments, the driver drill may include, on an inner surface of the housing, a recess in which lead wires are disposed.

With the above configuration, the positional displacement of the lead wire is effectively suppressed.

In one or more embodiments, the driver drill may have a protrusion protruding toward the recess, on the outer circumference of the motor bracket.

With the above configuration, the positional displacement of the lead wire is more effectively suppressed between the recess and the protrusion.

In one or more embodiments, the protrusion may include a first protrusion and a second protrusion in the circumferential direction of the motor bracket. In the radial direction of the rotation axis of the motor, the distance from the rotation axis to the leading end of the first protrusion may be shorter than a distance from the rotation axis to the leading end of the second protrusion.

With the above configuration, even with the protrusion, the external shape of the housing is less likely to be enlarged at the formation position of the first protrusion, making it possible to suppress enlargement of the driver drill.

In one or more embodiments, the first protrusion may be disposed on a side surface of the motor bracket. The second protrusion may be disposed, on the motor bracket, more upward or downward than the first protrusion.

With the above configuration, the width dimension of the driver drill is suppressed.

In one or more embodiments, the driver drill may further include a hammer mechanism that hammers the output part.

With the above configuration, drilling can be performed using hammering. Even in the case of hammering, positional displacement of the lead wire due to hammering is effectively suppressed.

In one or more embodiments, the speed reduction mechanism may be a multi-stage speed changer. The driver drill may further include a speed switching lever disposed in an upper portion of the housing to switch a speed reduction ratio of the speed reduction mechanism. The element may include a sensor that detects switching of the speed reduction ratio performed by the speed switching lever.

With the above configuration, the lead wire connected to the sensor on the upper portion of the housing is appropriately held.

In one or more embodiments, the element may include a notification lamp that notifies a driving state of the motor.

With the above configuration, the lead wire connected to the notification lamp is appropriately held.

In one or more embodiments, the element may include an operation switch that receives an operation input.

With the above configuration, the lead wire connected to the operation switch is appropriately held.

In one or more embodiments, the hammer driver drill may include: a motor; an output part provided in front of the motor and driven by the motor; a speed reduction mechanism disposed between the motor and the output part; a hammer mechanism provided between the speed reduction mechanism and the output part; a motor bracket disposed between the motor and the speed reduction mechanism; a housing that houses the motor and the motor bracket; an element provided above the motor or the speed reduction mechanism; and a lead wire connected to the element and extending more downward than the motor. The lead wire may be held by the motor bracket.

With the above configuration, the lead wire connected to the element is appropriately held while suppressing an increase in the external dimension. Even in the case of hammering, positional displacement of the lead wire due to hammering is effectively suppressed.

In one or more embodiments, the hammer driver drill may include: a motor; an output part provided forward of the motor and driven by the motor; a speed reduction mechanism disposed between the motor and the output part; a hammer mechanism disposed between the output part and the speed reduction mechanism; a housing that houses the motor and the speed reduction mechanism; an element provided above the motor and the speed reduction mechanism; and a controller provided downward of the motor and connected to the element via a lead wire. A passage through which the lead wire passes may be provided between the motor and the speed reduction mechanism in a front-rear direction.

With the above configuration, the lead wire connected to the element is appropriately held while suppressing an increase in the external dimension. Even in the case of hammering, positional displacement of the lead wire due to hammering is effectively suppressed.

In one or more embodiments, the hammer driver drill may further include a motor bracket disposed between the motor and the speed reduction mechanism to position the motor and the speed reduction mechanism. The passage may be provided between the motor bracket and the housing surrounding the outer circumference of the motor bracket.

With the above configuration, the passage of the lead wire is constructed without increasing the number of components.

Hereinafter, embodiments according to the present disclosure will be described with reference to the drawings, although the present disclosure is not limited to this. The components of the embodiments described below can be appropriately combined. In addition, there may be cases where some components are omitted in use.

In the embodiment, the positional relationship of each component will be described using terms of “left”, “right”, “front”, “rear”, “up”, and “down”. These terms indicate the relative position or direction with respect to the center of the driver drill.

The driver drill includes a motor. In the embodiment, a direction parallel to a rotation axis AX of the motor is appropriately referred to as an axial direction, a direction around the rotation axis AX is appropriately referred to as a circumferential direction or a rotation direction, and a radiation direction of the rotation axis AX is appropriately referred to as a radial direction.

In the embodiment, the rotation axis AX extends in the front-rear direction. The axial direction and the front-rear direction coincide with each other. One side in the axial direction is forward, and the other side in the axial direction is rearward. In the radial direction, a position close to or a direction approaching the rotation axis AX is appropriately referred to as radially inward, and a position far from or a direction away from the rotation axis AX is appropriately referred to as radially outward.

Overview of Driver Drill

Figure 2:
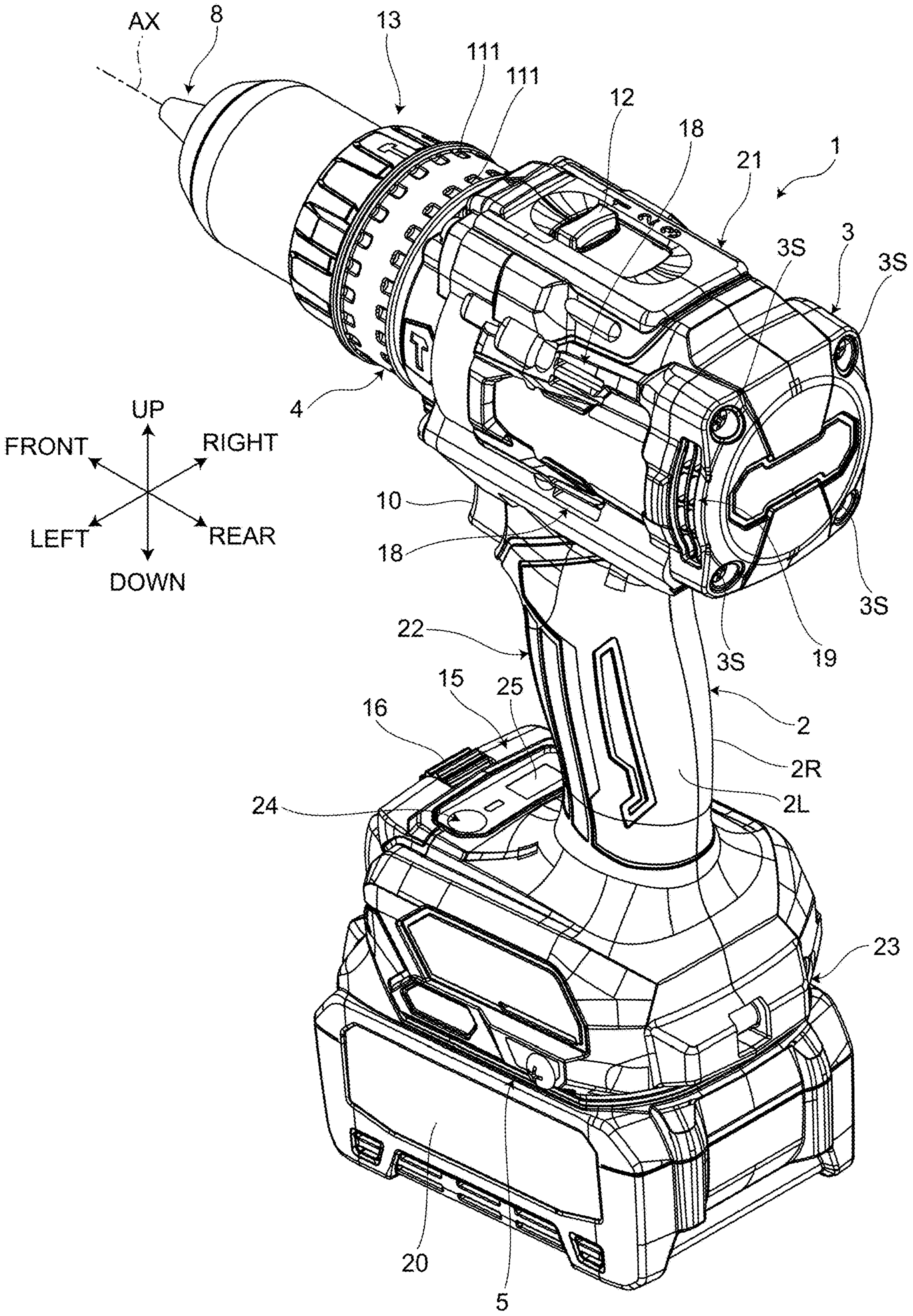
FIG. 2 is a rear perspective view illustrating the driver drill according to the embodiment.
Figure 3:
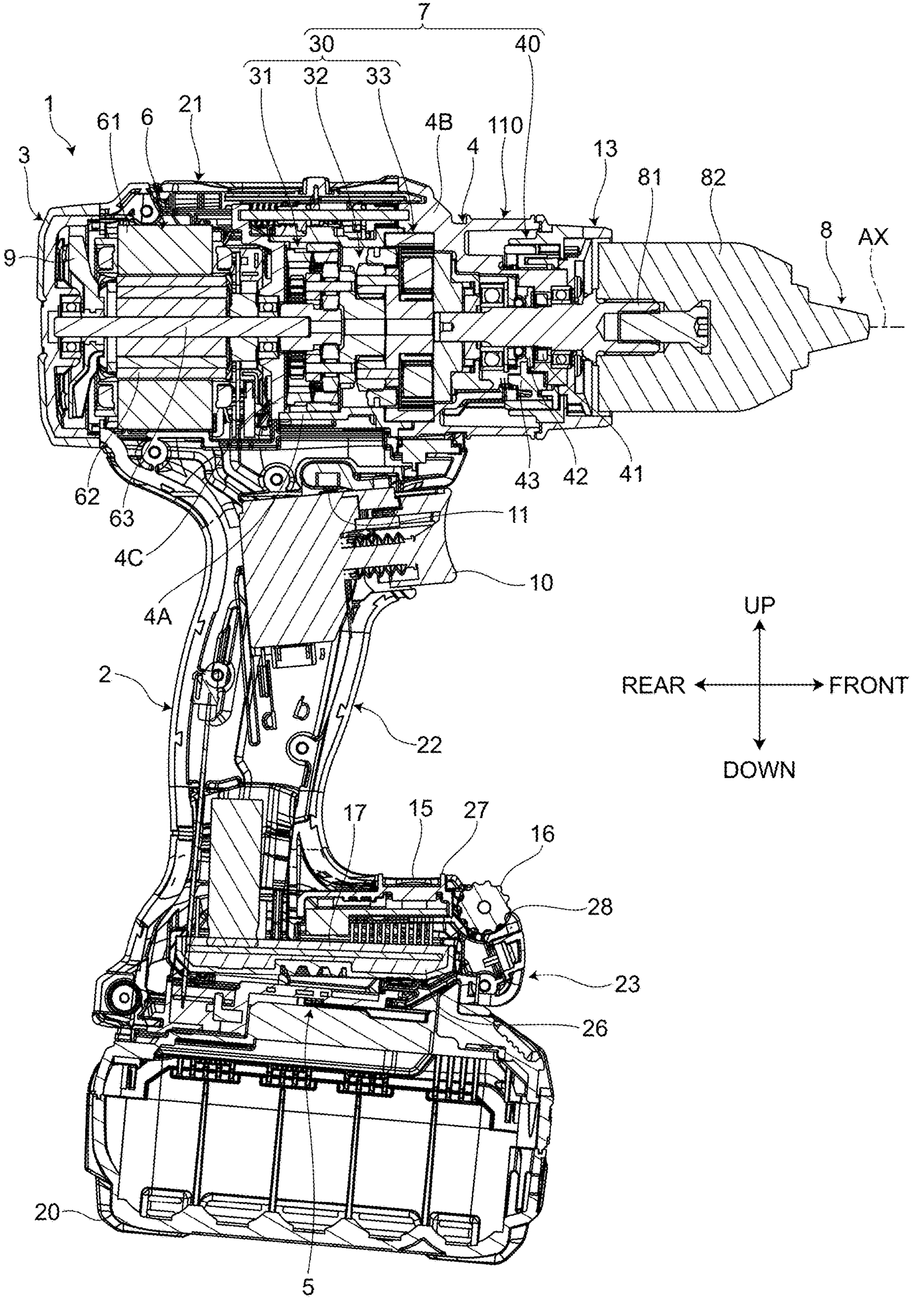
FIG. 3 is a cross-sectional view illustrating the driver drill according to the embodiment.
Figure 4:
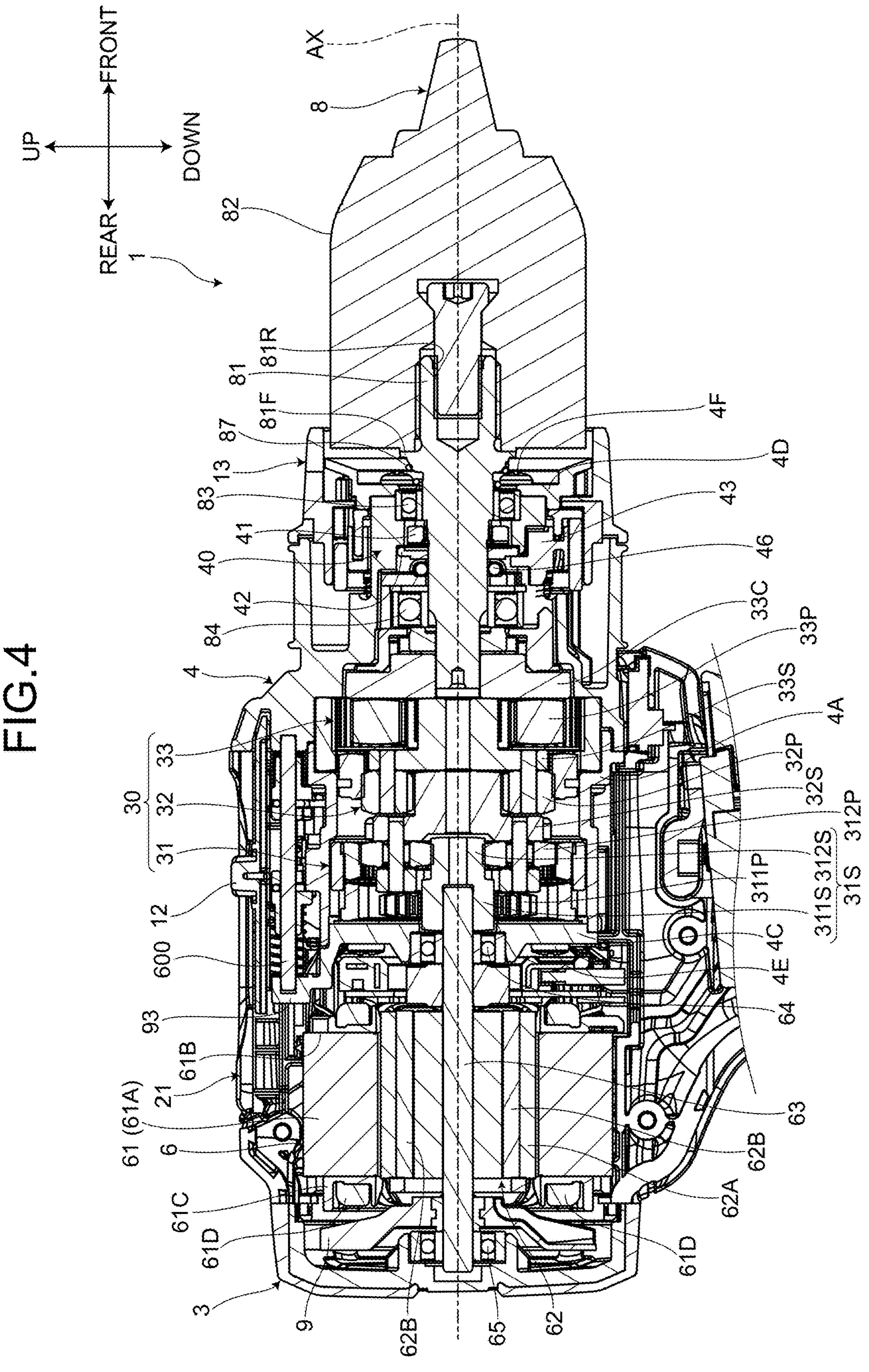
FIG. 4 is a cross-sectional view illustrating a part of the driver drill according to the embodiment.

FIG. 1 is a front perspective view illustrating a driver drill 1 according to the embodiment. FIG. 2 is a rear perspective view illustrating the driver drill 1 according to the embodiment. FIG. 3 is a cross-sectional view illustrating the driver drill according to the embodiment. In the embodiment, the driver drill 1 is a hammer driver drill. FIG. 4 is a cross-sectional view illustrating a part of the driver drill 1 according to the embodiment.

As illustrated in FIGS. 1, 2, 3, and 4, the driver drill 1 includes a housing 2, a rear cover 3, a casing 4, a battery mounting part 5, a motor 6, a power transmission mechanism 7, an output part 8, a fan 9, a trigger lever 10, a forward/reverse switching lever 11, a speed switching lever 12, a mode switching ring 13, an interface panel 15, a dial 16, and a controller 17.

The housing 2 is made of synthetic resin. In the embodiment, the housing 2 is made of nylon. The housing 2 includes a left housing 2L and a right housing 2R. The left housing 2L and the right housing 2R are fixed by screws 2S. The left housing 2L and the right housing 2R, fixed to each other, form the housing 2.

The housing 2 includes a motor housing part 21, a grip part 22, and a battery holding part 23.

The motor housing part 21 houses the motor 6. The motor housing part 21 has a tubular shape. The motor housing part 21 is disposed so as to cover the circumference of the motor 6.

The grip part 22 is configured to be gripped by an operator. The grip part 22 is disposed downward of the motor housing part 21. The grip part 22 extends downward from the motor housing part 21. The trigger lever 10 is disposed at a front portion of the grip part 22.

The battery holding part 23 houses the controller 17. The battery holding part 23 is disposed at a lower position of the grip part 22. The battery holding part 23 is connected to a lower end portion of the grip part 22. In both the front-rear direction and the left-right direction, the dimension of the outer shape of the battery holding part 23 is larger than the dimension of the outer shape of the grip part 22.

The rear cover 3 is made of synthetic resin. The rear cover 3 is disposed rearward of the motor housing part 21. The rear cover 3 is disposed so as to cover a rear portion of the motor 6. The rear cover 3 houses the fan 9. The rear cover 3 is disposed to cover an opening in a rear portion of the motor housing part 21. The rear cover 3 is fixed to the motor housing part 21 by screws 3S. The motor housing part 21 and the rear cover 3 are envelopment members that cover the circumference and a rear portion of the motor 6. The motor housing part 21 and the rear cover 3 may be integrated with each other.

The motor housing part 21 has an air-intake ports 18. The rear cover 3 has air-exhaust ports 19. Air in the external space of the housing 2 flows into the internal space of the housing 2 via the air-intake ports 18. Air in the internal space of the housing 2 flows out to the external space of the housing 2 via the air-exhaust ports 19.

The casing 4 houses the power transmission mechanism 7. The casing 4 includes a first casing 4A, a second casing 4B, and a motor bracket 4C. The second casing 4B is disposed forward of the first casing 4A. The mode switching ring 13 is disposed forward of the second casing 4B. The first casing 4A and the motor bracket 4C are made of synthetic resin. The second casing 4B is made of a metal. In the embodiment, the second casing 4B is made of aluminum or an aluminum alloy. The casing 4 is connected to a front portion of the motor housing part 21. The first casing 4A and the second casing 4B each have a tubular shape.

The first casing 4A is fixed to a rear end portion of the second casing 4B. The motor bracket 4C is disposed so as to cover an opening at a rear end portion of the first casing 4A. The motor bracket 4C is fixed to a rear end portion of the first casing 4A by screws 4E. There is provided a stop plate 4D at a front end portion of the second casing 4B. The stop plate 4D is disposed so as to cover an opening in a front end portion of the second casing 4B. The stop plate 4D is fixed to the front end portion of the second casing 4B by screws 4F.

The casing 4 is disposed so as to cover an opening in a front portion of the motor housing part 21. The first casing 4A is disposed inside the motor housing part 21. The second casing 4B is fixed to the motor housing part 21 by screws 4S.

The battery mounting part 5 is formed at a lower portion of the battery holding part 23. The battery mounting part 5 is connectable to the battery pack 20. The battery pack 20 is mounted on the battery mounting part 5. The battery pack 20 is detachable from the battery mounting part 5. The battery pack 20 includes a secondary battery. In embodiments, the battery pack 20 includes a rechargeable lithium-ion battery. By being mounted to the battery mounting part 5, the battery pack 20 can supply electric power to the driver drill 1. The motor 6 is driven using electric power supplied from the battery pack 20. The interface panel 15 and the controller 17 operate using electric power supplied from the battery pack 20.

The motor 6 is a power source of the driver drill 1. The motor 6 is an inner rotor type brushless motor. The motor 6 is housed in the motor housing part 21. The motor 6 includes: a stator 61 having a tubular shape; and a rotor 62 disposed inside the stator 61. The rotor 62 rotates relative to the stator 61. The rotor 62 includes a rotor shaft 63 extending in the axial direction.

The power transmission mechanism 7 is disposed forward of the motor 6. The power transmission mechanism 7 is housed in the casing 4. The power transmission mechanism 7 couples the rotor shaft 63 and the output part 8 to each other. The power transmission mechanism 7 transmits motive power generated by the motor 6 to the output part 8. The power transmission mechanism 7 includes a plurality of gears.

The power transmission mechanism 7 includes a speed reduction mechanism 30 and a hammer mechanism 40.

The speed reduction mechanism 30 reduces the rotation speed input from the rotor 62 (rotor shaft 63) to rotate the output part 8 at a rotational speed lower than the rotation speed of the rotor 62. In the embodiment, the speed reduction mechanism 30 includes a first planetary gear mechanism 31, a second planetary gear mechanism 32, and a third planetary gear mechanism 33. At least a portion of the first planetary gear mechanism 31 is disposed more forward than the motor 6. The second planetary gear mechanism 32 is disposed more forward of the first planetary gear mechanism 31. The third planetary gear mechanism 33 is disposed more forward than the second planetary gear mechanism 32. The first planetary gear mechanism 31 is driven by the rotational force of the motor 6. The second planetary gear mechanism 32 is driven by the rotational force of the first planetary gear mechanism 31. The third planetary gear mechanism 33 is driven by the rotational force of the second planetary gear mechanism 32.

The hammer mechanism 40 causes the output part 8 to hammer in the axial direction. The hammer mechanism 40 includes a first cam 41, a second cam 42, and a hammer switching ring 43.

The output part 8 is disposed more forward than the motor 6. The output part 8 is rotated by the rotational force of the rotor 62. The output part 8 rotates with a bit attached, in response to application of the rotational force transmitted from the rotor 62 via the power transmission mechanism 7. The output part 8 includes: a spindle 81 that rotates about the rotation axis AX in response to application of the rotational force transmitted from the rotor 62; and a chuck 82 mounted on a front end portion of the spindle 81. The bit is held in (by) the chuck 82. A front end portion of the chuck 82 is disposed more forward than the casing 4. At least a portion of the spindle 81 is disposed more forward than the third planetary gear mechanism 33. The spindle 81 is coupled to the third planetary gear mechanism 33. The spindle 81 is rotated by the rotational force of the rotor 62 transmitted via the first planetary gear mechanism 31, the second planetary gear mechanism 32, and the third planetary gear mechanism 33.

The fan 9 is disposed rearward of the motor 6. The fan 9 generates an air flow for cooling the motor 6. The fan 9 is fixed to the rotor 62. The fan 9 is fixed to a rear portion of the rotor shaft 63. The fan 9 is rotated by the rotation of the rotor shaft 63. When the rotor shaft 63 rotates, the fan 9 rotates together with the rotor shaft 63. When the fan 9 rotates, air that is outside of the housing 2 flows into the internal space of the housing 2 via the air-intake ports 18. The air flowing into the internal space of the housing 2 flows through the internal space of the housing 2 to cool the motor 6. The air flowing through the internal space of the housing 2 flows out to the external space of the housing 2 via the air-exhaust ports 19.

The trigger lever 10 is operated to start the motor 6. The trigger lever 10 is provided at an upper portion of the grip part 22. The front end portion of the trigger lever 10 protrudes forward from a front portion of the grip part 22. The trigger lever 10 is movable in the front-rear direction. The trigger lever 10 is operated by an operator. By operating the trigger lever 10 to move rearward, the motor 6 starts. By releasing the operation of the trigger lever 10, the motor 6 stops.

The forward/reverse switching lever 11 is operated (pressed, slid) to switch the rotation direction of the motor 6. The forward/reverse switching lever 11 is provided at an upper portion of the grip part 22. A left end portion of the forward/reverse switching lever 11 protrudes leftward from a left portion of the grip part 22. A right end portion of the forward/reverse switching lever 11 protrudes rightward from the right portion of the grip part 22. The forward/reverse switching lever 11 is movable in the left-right direction. The forward/reverse switching lever 11 is operated by an operator. By operating the forward/reverse switching lever 11 to move leftward, the motor 6 rotates in the forward-rotational direction. BY operating the forward/reverse switching lever 11 to move rightward, the motor 6 rotates in the reverse-rotational direction. By switching the rotation direction of the motor 6, the rotation direction of the spindle 81 switches.

The speed switching lever 12 is operated (slid) to change the speed mode (gear shift positions) of the speed reduction mechanism 30. The speed switching lever 12 is provided at (on) an upper portion of the motor housing part 21. The speed switching lever 12 is movable in the front-rear direction. The speed switching lever 12 is operated by an operator. The speed modes (variable-speed stages) of the speed reduction mechanism 30 includes a low speed mode (speed "1"), a medium speed mode (speed "2"), and a high speed mode (speed "3"). That is, the number of gear shift positions of the speed reduction mechanism 30 is three. The speed reduction mechanism 30 is a three-stage, variable-speed, speed reduction mechanism.

The low speed mode refers to a speed mode in which the output part 8 is caused to rotate at the first rotation speed (low speed) while the rotor 62 is rotating at a given constant rotation speed. The medium speed mode refers to a speed mode in which the output part 8 is caused to rotate at a second rotation speed (medium speed) higher than the first rotation speed while the rotor 62 is rotating at a given constant rotation speed. The high speed mode refers to a speed mode in which the output part 8 is caused to rotate at a third rotation speed (high speed) higher than the second rotation speed while the rotor 62 is rotating at a given constant rotation speed. The movable range of the speed switching lever 12 is defined in the front-rear direction. By operating (sliding) the speed switching lever 12 to move to a front portion of the movable range, the speed mode of the speed reduction mechanism 30 is set to the low speed mode. By operating the speed switching lever 12 to move to an intermediate portion of the movable range, the speed mode of the speed reduction mechanism 30 is set to the medium speed mode. By operating the speed switching lever 12 to move to a rear portion of the movable range, the speed mode of the speed reduction mechanism 30 is set to the high speed mode.

The mode switching ring 13 is operated (rotated) to change an operation mode of the hammer mechanism 40. The mode switching ring 13 is disposed forward of the casing 4. The mode switching ring 13 is rotatable. The mode switching ring 13 is operated by an operator. The operation mode of the hammer mechanism 40 includes a hammering mode and a non-hammering mode. The hammering mode refers to an operation mode in which the output part 8 is caused to hammer in the axial direction. The non-hammering mode refers to an operation mode in which the output part 8 is not caused to hammer in the axial direction. By operating the mode switching ring 13 to be disposed at a hammering mode position in the rotation direction, the operation mode of the hammer mechanism 40 is set to the hammering mode. By operating the mode switching ring 13 to be disposed at the non-hammering mode position in the rotation direction, the operation mode of the hammer mechanism 40 is set to the non-hammering mode.

The interface panel 15 is provided on the battery holding part 23. The interface panel 15 includes an operation device 24 and a display device 25. The interface panel 15 has a plate shape. The operation device 24 includes at least one operation button. Examples of the display device 25 include: a segmented-display device including a plurality of segment, light emitting devices; a flat-panel display such as a liquid crystal display; and an indicator-type display device, on which a plurality of light emitting diodes are disposed.

The battery holding part 23 has a panel opening 27. The panel opening 27 is formed on the upper surface of the battery holding part 23 more forward than the grip part 22. At least a portion of the interface panel 15 is disposed in the panel opening 27.

The operation device 24 is operated (pressed) to change the drive mode of the motor 6. The operation device 24 is operated by an operator. The drive modes of the motor 6 includes a drilling mode and a screwdriving (clutch) mode. The drilling mode refers to a drive mode in which, during the drive of the motor 6, the motor 6 is driven regardless of the torque acting on the motor 6. The screwdriving (clutch) mode refers to a drive mode in which, during the drive of the motor 6, the motor 6 is caused to stop when the momentary currently being supplied to the motor 6 exceeds an electric-current threshold.

The dial 16 is operated (rotated) to change a driving condition of the motor 6. The dial 16 is disposed at a front portion of the battery holding part 23. The dial 16 is rotatably supported by (on) the battery holding part 23. The dial 16 is rotatable over 360° or more. The dial 16 is operated by an operator. The driving conditions of the motor 6 include the electric-current threshold. The dial 16 is operated to change the electric-current threshold in the screwdriving (clutch) mode set by (using) the operation device 24.

The battery holding part 23 has a dial opening 28. The dial opening 28 is formed in a right portion of a front portion of the battery holding part 23. At least a portion of the dial 16 is disposed in the dial opening 28.

The controller 17 includes a computer system. The controller 17 outputs control commands for controlling the motor 6. At least a portion of the controller 17 is housed in a controller case 26. While being held in the controller case 26, the controller 17 is housed in the battery holding part 23. The controller 17 includes a circuit board on which a plurality of electronic components are mounted. Examples of the electronic components mounted on the circuit board include: a processor such as a central processing unit (CPU); nonvolatile memory such as read only memory (ROM) or storage; volatile memory such as random access memory (RAM); transistors; a capacitors; and resistors.

The controller 17 sets the driving conditions of the motor 6 in response to the operation (rotation) of the dial 16. As described above, the driving conditions of the motor 6 include the electric-current threshold. In the screwdriving (clutch) mode, the controller 17 sets the electric-current threshold in response to the operation of the dial 16.

In the screwdriving (clutch) mode, the controller 17 stops the motor 6 when the torque acting on the motor 6 during the driving of the motor 6 exceeds the electric-current threshold.

The controller 17 controls the display device 25 to display the set driving condition of the motor 6.

Motor and Power Transmission Mechanism

As illustrated in FIG. 4, the motor 6 includes a stator 61 having a tubular shape; and a rotor 62 disposed inside the stator 61. The rotor 62 includes a rotor shaft 63 extending in the axial direction.

The stator 61 includes: a stator core 61A including a plurality of stacked steel plates; a front insulator 61B disposed at a front portion of the stator core 61A; a rear insulator 61C disposed at a rear portion of the stator core 61A; a plurality of coils 61D wound around the stator core 61A and over (around) the front insulator 61B and the rear insulator 61C; a sensor circuit board mounted on the front insulator 61B; and a short-circuiting member supported by (on) the front insulator 61B. The sensor circuit board 61E includes a plurality of rotation detection elements to detect the rotation of the rotor 62. The rotation detection elements of the sensor circuit board detect the magnetic fields of the permanent magnets 62B, thereby detecting the rotation of the rotor 62. The controller 17 supplies drive currents to the coils 61D based on the detection data from the rotation detection elements. The short-circuiting member connects the plurality of coils 61D via fusing terminals. The short-circuiting member is connected to the controller 17 via lead wires.

The rotor 62 rotates about the rotation axis AX. The rotor 62 includes: a rotor shaft 63; a rotor core 62A disposed around the rotor shaft 63; and the plurality of permanent magnets 62B held on (in) the rotor core 62A. The rotor core 62A has a cylindrical shape. The rotor core 62A includes a plurality of stacked steel plates. The rotor core 62A has through holes extending in the axial direction. The through holes are disposed equispaced around in the circumferential direction. The permanent magnets 62B are respectively disposed (embedded) in the plurality of through holes of the rotor core 62A.

The rotor shaft 63 rotates about the rotation axis AX. The rotation axis AX of the rotor shaft 63 coincides with the rotation axis of the output part 8. A front portion of the rotor shaft 63 is rotatably supported by a (first) bearing 64. A rear portion of the rotor shaft 63 is rotatably supported by a (second) bearing 65. The bearing 64 is held by a motor bracket 4C disposed forward of the stator 61. The bearing 65 is held by the rear cover 3. A front end portion of the rotor shaft 63 is disposed more forward than the bearing 64. A front end portion of the rotor shaft 63 is disposed in the internal space of the casing 4.

At a front end portion of the rotor shaft 63, a pinion gear 31S is provided. The pinion gear 31S functions as the sun gear of the first planetary gear mechanism 31. The pinion gear 31S is rotated by the motor 6. The pinion gear 31S includes a large diameter portion 311S and a small diameter portion 312S disposed more forward than the large diameter portion 311S. The rotor shaft 63 is coupled to the first planetary gear mechanism 31 of the speed reduction mechanism 30 via the pinion gear 31S.

Figure 5:
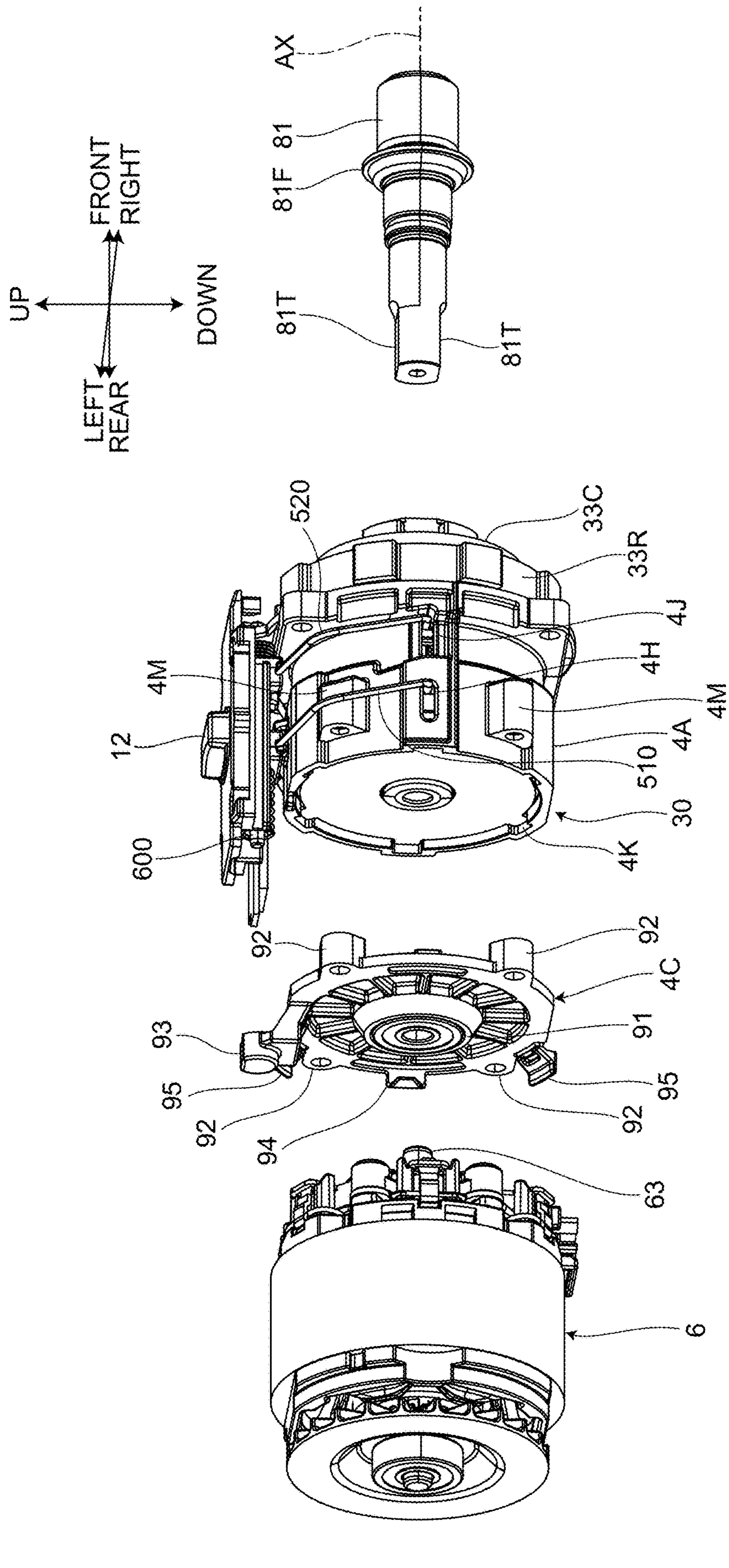
FIG. 5 is an exploded rear perspective view illustrating a motor, a motor bracket, and a speed reduction mechanism according to the embodiment.

FIG. 5 is an exploded rear perspective view illustrating the motor 6, the motor bracket 4C, and the speed reduction mechanism 30 according to the embodiment. The motor bracket 4C is disposed between the motor 6 and the speed reduction mechanism 30. The rotor shaft 63 of the motor 6 passes through the motor bracket 4C so as to be connected to the speed reduction mechanism 30 (pinion gear 31S). The spindle 81 is disposed forward of the speed reduction mechanism 30. The spindle 81 is coupled to a third carrier 33C of the speed reduction mechanism 30. In the embodiment, a pair of flat surfaces 81T is formed on an outer circumferential surface of the spindle 81. The flat surfaces 81T are parallel to rotation axis AX. The pair of flat surfaces 81T face each other in opposite directions. The third carrier 33C is disposed around the spindle 81. An inner circumferential surface of the third carrier 33C includes support surfaces, which respectively make contact with the pair of flat surfaces 81T. Relative rotation between the third carrier 33C and the spindle 81 is constrained (blocked, prevented) by the flat surfaces 81T. By the rotation of the third carrier 33C, the spindle 81 rotates together with the third carrier 33C.

As illustrated in FIG. 4, the spindle 81 is rotatably supported by a (first) bearing 83 and a (second) bearing 84. The spindle 81 is movable in the front-rear direction while being supported by the bearing 83 and the bearing 84.

The spindle 81 has a flange portion 81F. There is provided a coil spring 87 between the flange portion 81F and the bearing 83. The flange portion 81F makes contact with a front end portion of the coil spring 87. The coil spring 87 generates an elastic force that moves (urges) the spindle 81 forward.

The chuck 82 is capable of holding a bit. The chuck 82 is coupled to a front portion of the spindle 81. A screw hole 81R is provided at (in) a front end portion of the spindle 81. Rotation of the spindle 81 rotates the chuck 82. The chuck 82 rotates while holding the bit.

Figure 6:
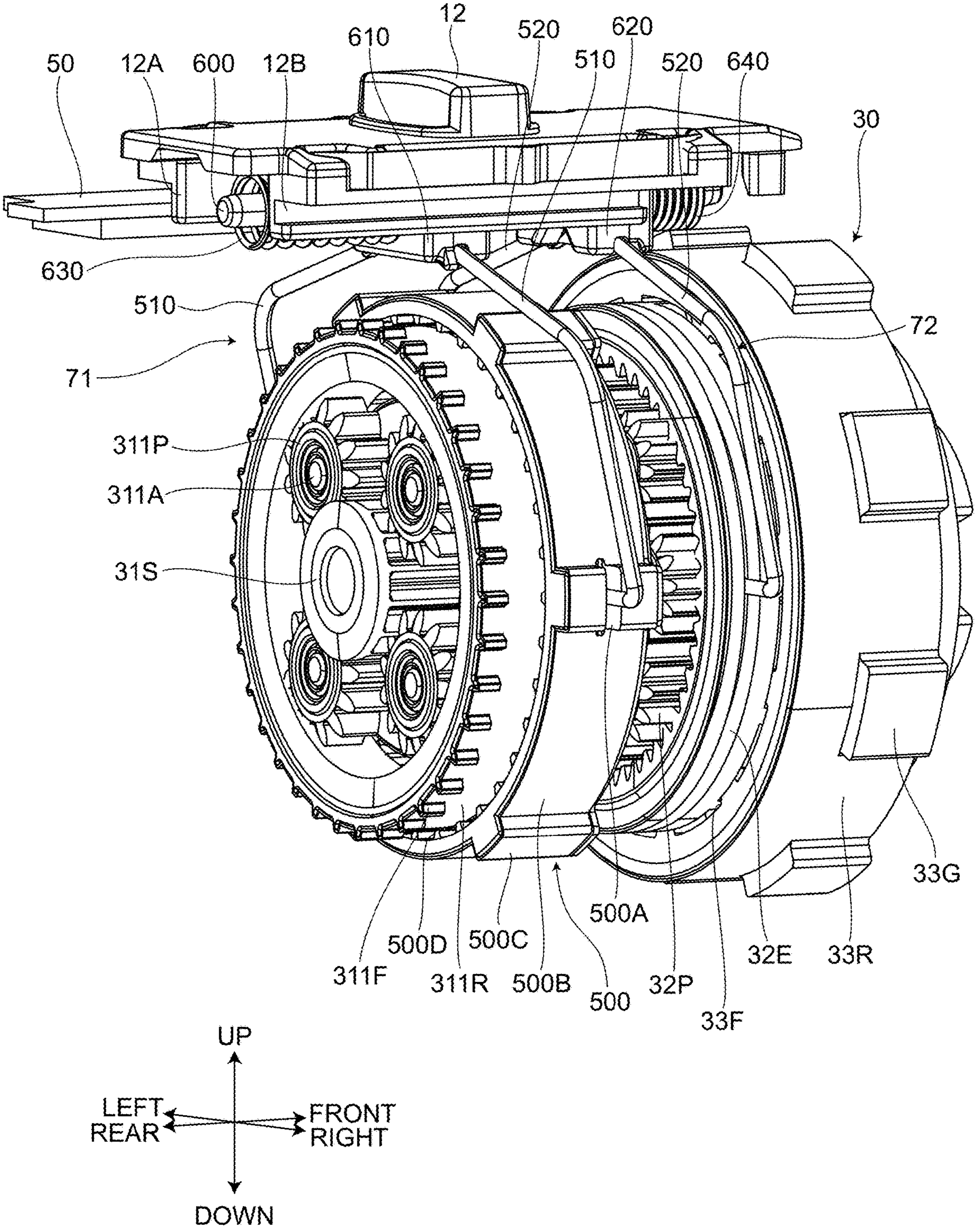
FIG. 6 is a rear perspective view illustrating a part of the speed reduction mechanism according to the embodiment.

FIG. 6 is a rear perspective view illustrating a part of the speed reduction mechanism 30 according to the embodiment.

The speed switching lever 12 is operated (slid) to change the speed mode of the speed reduction mechanism 30. The speed switching lever 12 is mechanically connected to the speed reduction mechanism 30. The speed switching lever 12 is provided upward of the casing 4 (refer to FIG. 1). The speed switching lever 12 is movable (slidable) in the front-rear direction. The speed switching lever 12 is configured to be operated by an operator. The speed modes of the speed reduction mechanism 30 include the low speed mode (speed “1”), the medium speed mode (speed “2”), and the high speed mode (speed “3”). By operating the speed switching lever 12 to move to a front portion of the movable range, the speed mode of the speed reduction mechanism 30 is set to the low speed mode (speed “1”). By operating the speed switching lever 12 to move to an intermediate portion of the movable range, the speed mode of the speed reduction mechanism 30 is set to the medium speed mode (speed “2”). By operating the speed switching lever 12 to move to a rear portion of the movable range, the speed mode of the speed reduction mechanism 30 is set to the high speed mode (speed “3”).

Figure 7:
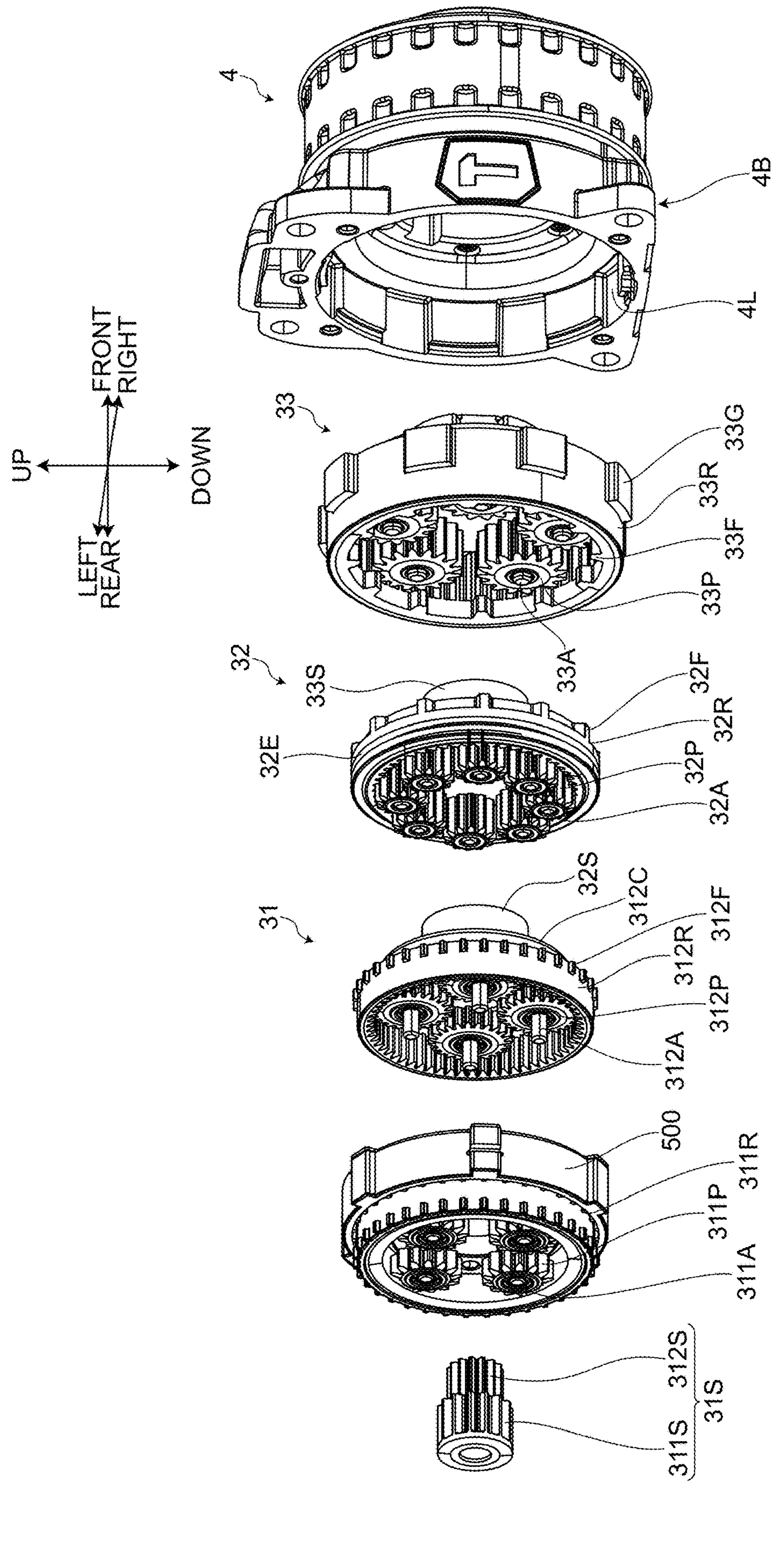
FIG. 7 is an exploded rear perspective view illustrating the speed reduction mechanism according to the embodiment.
Figure 8:
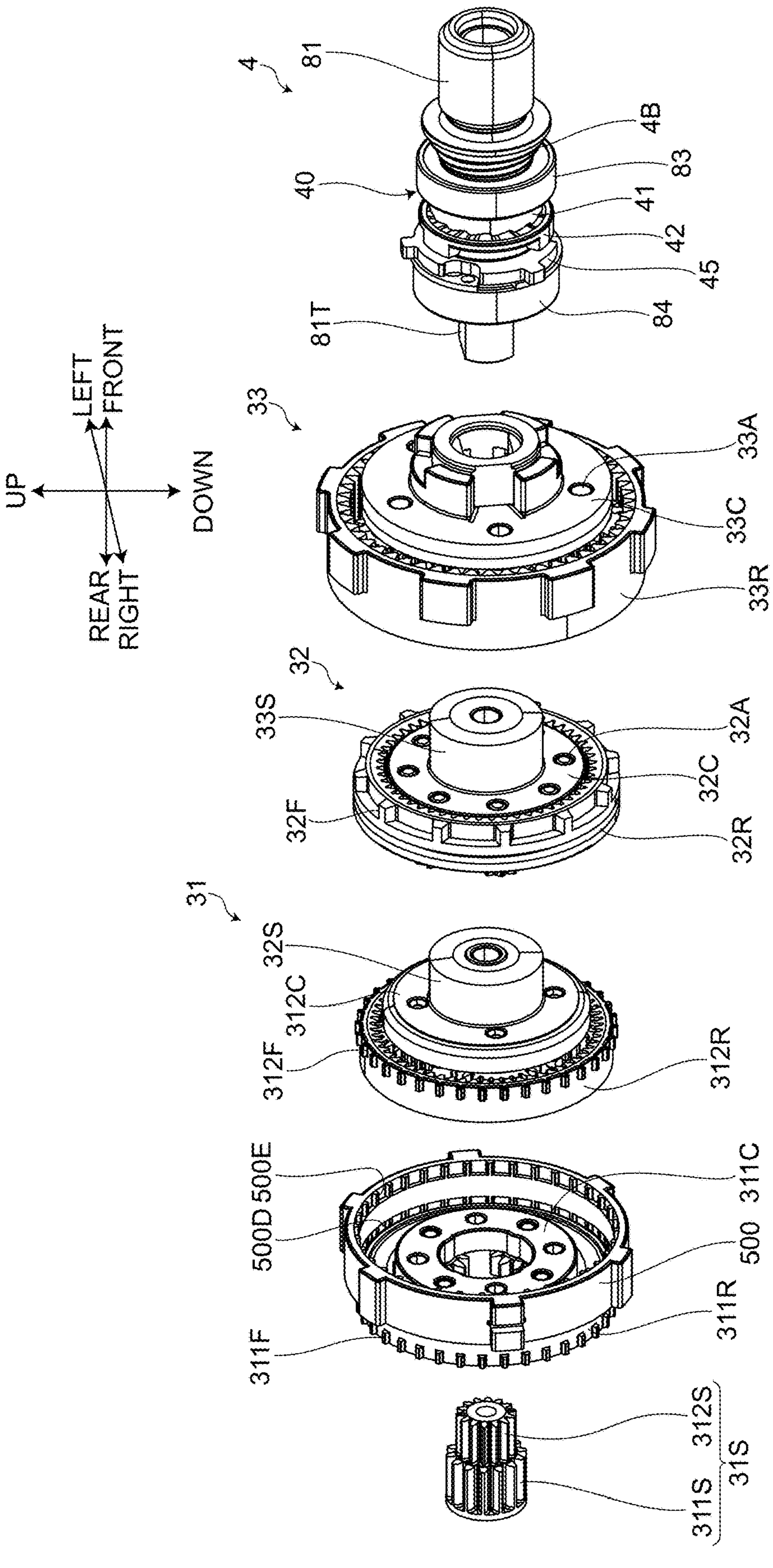
FIG. 8 is an exploded front perspective view illustrating the speed reduction mechanism according to the embodiment.

FIG. 7 is an exploded rear perspective view illustrating the speed reduction mechanism according to the embodiment. FIG. 8 is an exploded front perspective view illustrating the speed reduction mechanism according to the embodiment. Sun gears 32S and 33S are illustrated in a cylindrical shape with simplified teeth.

The first planetary gear mechanism 31 includes: planetary gears 311P (first planetary gears); planetary gears 312P (second planetary gears) disposed more forward than the planetary gears 311P; a first stage carrier 311C that supports both the plurality of planetary gears 311P and the plurality of planetary gears 312P; a second stage carrier 312C that supports the plurality of planetary gears 312P; an internal gear 311R disposed around the plurality of planetary gears 311P; and an internal gear 312R disposed around the plurality of planetary gears 312P. The pinion gear 31S is provided at a front end portion of the rotor shaft 63. The pinion gear 31S functions as the sun gear of the first planetary gear mechanism 31. The pinion gear 31S is disposed forward of the stator 61. The pinion gear 31S is rotated by the rotor 62. The pinion gear 31S may be directly or indirectly rotated by the rotor 62.

The second planetary gear mechanism 32 includes: a sun gear 32S; a plurality of planetary gears 32P disposed around the sun gear 32S; a second carrier 32C supporting the plurality of planetary gears 32P; and an internal gear 32R disposed around the plurality of planetary gears 32P. The sun gear 32S is disposed forward of the internal gear 311R and the internal gear 312R. The sun gear 32S may be directly or indirectly rotated by the planetary gears 311P and the planetary gears 312P. The planetary gears 32P meshes with the sun gear 32S. The internal gear 32R meshes with the planetary gears 32P.

The third planetary gear mechanism 33 includes: a sun gear 33S; a plurality of planetary gears 33P disposed around the sun gear 33S; the third carrier 33C supporting the plurality of planetary gears 33P; and an internal gear 33R disposed around the plurality of planetary gears 33P.

The planetary gears 311P of the first planetary gear mechanism 31 is disposed around the large diameter portion 311S of the pinion gear 31S. The planetary gears 312P are disposed around the small diameter portion 312S of the pinion gear 31S.

The casing 4 houses the pinion gear 31S, the planetary gears 311P, the planetary gears 312P, the internal gear 311R, the internal gear 312R, the sun gear 32S, and the planetary gears 32P. The spindle 81 is disposed forward of the internal gear 33R. The spindle 81 may be directly or indirectly rotated by the planetary gears 33P.

The planetary gears 311P are rotatably supported by first pins 311A, respectively. The first pins 311A are supported by (on) the first stage carrier 311C. The first pins 311A protrude rearward from a rear surface of the first stage carrier 311C. The first pins 311A are provided spaced apart in the circumferential direction. In the embodiment, four of the first pins 311A are provided equispaced in the circumferential direction. One planetary gear 311P is supported on each first pin 311A of the plurality of (four) first pins 311A. The planetary gears 311P are disposed more rearward than the first stage carrier 311C. The first stage carrier 311C rotatably supports the planetary gears 311P via the first pins 311A.

The planetary gears 312P are rotatably supported by second pins 312A, respectively. The second pins 312A are supported by (on) both the first stage carrier 311C and the second stage carrier 312C. The first stage carrier 311C is disposed more rearward than the second stage carrier 312C. A rear end portion of each of the second pins 312A is supported by the first stage carrier 311C. A front end portion of each of the second pin 312A is supported by (on) the second stage carrier 312C. The second pins 312A are provided spaces apart in the circumferential direction. In the embodiment, four of the second pins 312A are provided equispaced in the circumferential direction. In the circumferential direction, the locations of the first pins 311A and the locations of the second pins 312A differ from each other. In the circumferential direction, each of the second pins 312A is disposed between a pair of first pins 311A adjacent to each other. One planetary gear 312P is supported by each second pin 312A of the plurality of (four) second pins 312A. In the front-rear direction (axial direction), the planetary gears 312P are disposed between the first stage carrier 311C and the second stage carrier 312C. The first stage carrier 311C and the second stage carrier 312C each rotatably support the planetary gears 312P via the second pins 312A. A gear is provided on an outer circumferential portion of the second stage carrier 312C.

The internal gear 311R (first internal gear) is disposed around the plurality of planetary gears 311P. The internal gear 312R (second internal gear) is disposed around the plurality of planetary gears 312P. The outer diameter of the planetary gears 311P is smaller than the outer diameter of the planetary gears 312P.

The sun gear 32S of the second planetary gear mechanism 32 is disposed forward of the second stage carrier 312C. The diameter of the sun gear 32S is smaller than the diameter of the second stage carrier 312C. The second stage carrier 312C and the sun gear 32S are integrated with each other. The second stage carrier 312C and the sun gear 32S rotate together. There is provided pins 32A on the second carrier 32C. The planetary gears 32P are rotatably supported by the pins 32A, respectively. The second carrier 32C rotatably supports the planetary gears 32P via the pins 32A.

The sun gear 33S of the third planetary gear mechanism 33 is disposed forward of the second carrier 32C. The diameter of the sun gear 33S is smaller than the diameter of the second carrier 32C. The second carrier 32C and the sun gear 33S are integrated with each other. The second carrier 32C and the sun gear 33S rotate together. There is provided pins 33A on the third carrier 33C. The planetary gears 33P are rotatably supported by the pins 33A, respectively. The third carrier 33C rotatably supports the planetary gears 33P via the pins 33A.

As illustrated in FIG. 6, the speed reduction mechanism 30 includes a first speed switching mechanism 71 and a second speed switching mechanism 72.

The first speed switching mechanism 71 switches between: a first speed reduction mode, in which rotation of the internal gear 312R of the first planetary gear mechanism 31 is blocked and rotation of the internal gear 311R is permitted; and a second speed reduction mode, in which rotation of the internal gear 311R of the first planetary gear mechanism 31 is blocked and rotation of the internal gear 312R is permitted.

The first speed switching mechanism 71 includes a change ring 500, a first switching wire 510, a first movable member 610, and a first spring 630.

The change ring 500 includes: a ring portion 500B; and a plurality of protruding portions 500C fixed to the ring portion 500B. The protruding portions 500C are disposed in guide grooves 4K (refer to FIG. 5) provided in the inner circumferential surface of the first casing 4A. The guide grooves 4K extend in the front-rear direction. By disposing the protruding portions 500C in the guide grooves 4K of the first casing 4A, rotation of the change ring 500 relative to the first casing 4A is constrained (blocked, prevented). The change ring 500 is movable in the front-rear direction inside the first casing 4A. The change ring 500 can move in the front-rear direction while being guided in the guide grooves 4K. The change ring 500 is disposed around at least one of the internal gear 311R or the internal gear 312R.

The change ring 500 is coupled to the first switching wire 510. The change ring 500 is movable in the front-rear direction inside the first casing 4A. By moving the change ring 500 forward, the speed mode becomes the first speed reduction mode; and by moving the change ring 500 rearward, the speed mode becomes the second speed reduction mode.

In the first planetary gear mechanism 31, the speed reduction ratio of a front stage, which includes the planetary gears 312P and the internal gear 312R, is larger than the speed reduction ratio of a rear stage, which includes the planetary gears 311P and the internal gear 311R. When the pinion gear 31S rotates at a given constant rotation speed, the rotation speed of the second stage carrier 312C in the first speed reduction mode is lower than the rotation speed of the second stage carrier 312C in the second speed reduction mode.

In the embodiment, the speed reduction ratio of the second planetary gear mechanism 32 and the speed reduction ratio of the third planetary gear mechanism 33 are lower than the speed reduction ratio of the rear stage (first stage) of the first planetary gear mechanism 31. The speed reduction ratio of the second planetary gear mechanism 32 is lower than the speed reduction ratio of the third planetary gear mechanism 33.

As illustrated in FIGS. 5 and 6, the first switching wire 510 is disposed on the outer side the first casing 4A. The first switching wire 510 is movable in the front-rear direction on the outer side of the first casing 4A. A tip portion of the first switching wire 510 is inserted into a groove 500A provided in the change ring 500. The first casing 4A has a through hole 4H. The tip portion of the first switching wire 510 is disposed inside the first casing 4A via the through hole 4H. The tip portion of the first switching wire 510 is inserted into the groove 500A inside the first casing 4A. An upper portion of the first switching wire 510 is fixed to the first movable member 610. The first movable member 610 is connected to the speed switching lever 12. The first movable member 610 is guided in the front-rear direction by a guide rod 600. The guide rod 600 is disposed so as to extend in the front-rear direction. The guide rod 600 is fixed to the casing 4. A rear end portion of the guide rod 600 is fixed to the motor bracket 4C. A front end portion of the guide rod 600 is fixed to the second casing 4B. The first movable member 610 has a first guide hole extending in the front-rear direction. The guide rod 600 passes through the first guide hole of the first movable member 610. The first spring 630 is a compression spring. A rear end portion of the first spring 630 is supported by the motor bracket 4C. A front end portion of the first spring 630 is connected to the first movable member 610. The first spring 630 generates an elastic force such that the first movable member 610 moves forward (in one direction). The first spring 630 forwardly biases the change ring 500 via the first movable member 610 and the first switching wire 510.

As illustrated in FIG. 8, cam teeth 311F are provided on an outer circumferential surface of the internal gear 311R. Cam teeth 312F are also provided on an outer circumferential surface of the internal gear 312R. Cam grooves 500D and cam grooves 500E are provided in the inner circumferential surface of the change ring 500. The cam grooves 500D are formed at a rear end portion of the change ring 500 and engage with the cam teeth 311F of the internal gear 311R. The cam grooves 500E are formed in a front end portion of the change ring 500 and engage with the cam teeth 312F of the internal gear 312R. While being guided by the guide grooves 4K of the first casing 4A, the change ring 500 moves between a position where the cam grooves 500D engage with the cam teeth 311F and a position where the cam grooves 500E engage with the cam teeth 312F of the internal gear 312R.

The change ring 500 is connected to the speed switching lever 12 via the first switching wire 510 and the first movable member 610. When the speed switching lever 12 is operated (slide), the first movable member 610 moves in the front-rear direction. By operating the speed switching lever 12 so as to move in the front-rear direction, the first movable member 610 and the first switching wire 510 move in the front-rear direction, and the change ring 500 moves in the front-rear direction.

When the first movable member 610, the first switching wire 510, and the change ring 500 move forward, the change ring 500 is disposed around the internal gear 312R, the cam grooves 500E and the cam teeth 312F are engaged with each other. Thereby, rotation of the internal gear 312R is constrained (blocked, prevention). That is, by moving the first movable member 610, the first switching wire 510, and the change ring 500 forward and constraining rotation of the internal gear 312R, the first planetary gear mechanism 31 is placed in the first speed reduction mode.

When the first movable member 610, the first switching wire 510, and the change ring 500 move rearward to dispose the change ring 500 around the internal gear 311R, the cam grooves 500D and the cam teeth 311F are engaged with each other. Thereby, rotation of the internal gear 311R is constrained. That is, by moving the first movable member 610, the first switching wire 510, and the change ring 500 rearward and constraining rotation of the internal gear 311R, the first planetary gear mechanism 31 is placed in the second speed reduction mode.

The second speed switching mechanism 72 switches between: an enabled mode, in which the speed reduction function of the second planetary gear mechanism 32 is enabled; and a disabled mode, in which the speed reduction function of the second planetary gear mechanism 32 is disabled. Setting the second planetary gear mechanism 32 in the enabled mode includes constraining (blocking, preventing) rotation of the internal gear 32R. Setting the second planetary gear mechanism 32 to the disabled mode includes permitting rotation of the internal gear 32R. By constraining rotation of the internal gear 32R, the second planetary gear mechanism 32 is placed in the enabled mode. By permitting rotation of the internal gear 32R, the second planetary gear mechanism 32 is placed in the disabled mode.

As illustrated in FIGS. 5 and 6, the second speed switching mechanism 72 includes: a second switching wire 520 coupled to the internal gear 32R; cam teeth 33F provided on the internal gear 33R; a second movable member 620; and a second spring 640.

The second switching wire 520 is disposed on the outer side of the first casing 4A. The second switching wire 520 is movable in the front-rear direction on the outer side of the first casing 4A. The tip portion of the second switching wire 520 is inserted into a groove 32E provided in the internal gear 32R. The first casing 4A has a through hole 4J. The tip portion of the second switching wire 520 is disposed inside the first casing 4A through the through hole 4J. The tip portion of the second switching wire 520 is inserted into the groove 32E inside the first casing 4A. An upper portion of the second switching wire 520 is fixed to the second movable member 620. The second movable member 620 is connected to the speed switching lever 12. The second movable member 620 is disposed more forward than the first movable member 610. The second movable member 620 is guided in the front-rear direction by the guide rod 600. The second movable member 620 has a second guide hole extending in the front-rear direction. The guide rod 600 passes through the second guide hole of the second movable member 620. The second spring 640 is a compression spring. A front end portion of the second spring 640 is supported by (on) the second casing 4B. A rear end portion of the second spring 640 is connected to the second movable member 620. The second spring 640 generates an elastic force such that the second movable member 620 moves (is urged) rearward. The second spring 640 biases the internal gear 32R rearward via the second movable member 620 and the second switching wire 520.

As illustrated in FIG. 7, cam teeth 32F are provided on the outer circumferential surface of the internal gear 32R. The cam teeth 32F can mesh with the cam teeth 33F on the inner circumferential surface of the internal gear 33R. By inserting the internal gear 32R into the internal gear 33R, rotation of the internal gear 32R is constrained (blocked, prevented) by the cam teeth 33F of the internal gear 33R.

The internal gear 33R is disposed forward of the internal gear 32R. The internal gear 33R is fixed to the second casing 4B. Cam teeth 33G are provided on the outer circumferential surface of the internal gear 33R. The cam teeth 33G are respectively inserted into recesses 4L provided on (in) the inner circumferential surface of the second casing 4B. By inserting the cam teeth 33G into the recesses 4L, relative movement between the internal gear 33R and the second casing 4B is constrained (blocked, prevented).

When the speed switching lever 12 is operated (slid), the second movable member 620 moves in the front-rear direction. By operating the speed switching lever 12 so as to move in the front-rear direction, the second movable member 620 and the second switching wire 520 move in the front-rear direction, and the internal gear 32R moves in the front-rear direction. By moving the internal gear 32R in the front-rear direction, the internal gear 32R is switched between the state in which the internal gear 32R is inserted into the internal gear 33R and the state in which the internal gear 32R is removed from the internal gear 33R.

By moving the second movable member 620, the second switching wire 520, and the internal gear 32R forward, inserting at least a portion of the internal gear 32R into the interior of the internal gear 33R, and meshing the cam teeth 33F of the internal gear 33R with the cam teeth 32F of the internal gear 32R, rotation of the internal gear 32R is constrained (blocked, prevented). That is, by moving the second movable member 620, the second switching wire 520, and the internal gear 32R forward and constraining rotation of the internal gear 32R, the second planetary gear mechanism 32 is placed in the enabled mode.

By moving the second movable member 620, the second switching wire 520, and the internal gear 32R rearward, removing the internal gear 32R from the inside of the internal gear 33R, and separating the cam teeth 33F of the internal gear 33R from the cam teeth 32F of the internal gear 32R, rotation of the internal gear 32R is permitted. That is, by moving the second movable member 620, the second switching wire 520, and the internal gear 32R rearward and permitting rotation of the internal gear 32R, the second planetary gear mechanism 32 is placed in the disabled mode.

When the second planetary gear mechanism 32 is in the enabled mode, the internal gear 32R meshes only with the planetary gears 32P. When the second planetary gear mechanism 32 is in the disabled mode, the internal gear 32R meshes with both the planetary gears 32P and the gear on the outer circumferential portion of the second stage carrier 312C.

As described above, in the embodiment, the speed mode of the speed reduction mechanism 30 includes the low speed mode (speed "1"), the medium speed mode (speed "2"), and the high speed mode (speed "3").

The low speed mode includes the first planetary gear mechanism 31 being set to the first speed reduction mode and the second planetary gear mechanism 32 being set to the enabled mode. By operating the speed switching lever 12 so as to move to the front portion of the movable range and moving the second movable member 620 forward, the first planetary gear mechanism 31 is set to the first speed reduction mode, and the second planetary gear mechanism 32 is set to the enabled mode. That is, in the low speed mode (speed "1"), the front stage (second stage) of the first planetary gear mechanism 31, the second planetary gear mechanism 32, and the third planetary gear mechanism 33 are used (enabled).

The medium speed mode includes the first planetary gear mechanism 31 being set to the first speed reduction mode and the second planetary gear mechanism 32 being set to the disabled mode. By operating the speed switching lever 12 so as to move to the intermediate portion of the movable range, the first planetary gear mechanism 31 is set to the first speed reduction mode, and the second planetary gear mechanism 32 is set to the disabled mode. That is, in the medium speed mode (speed "2"), the front stage (second stage) of the first planetary gear mechanism 31 and the third planetary gear mechanism 33 are used (enabled).

The high speed mode includes the first planetary gear mechanism 31 being set to the second speed reduction mode and the second planetary gear mechanism 32 being set to the disabled mode. By operating the speed switching lever 12 so as to move to the rear portion of the movable range and moving the first movable member 610 rearward, the first planetary gear mechanism 31 is set to the second speed reduction mode and the second planetary gear mechanism 32 is set to the disabled mode. That is, in the high speed mode (speed "3"), the rear stage (first stage) of the first planetary gear mechanism 31 and the third planetary gear mechanism 33 are used (enabled).

The speed switching lever 12 is operated by the operator such that the first movable member 610 moves in the front-rear direction. The first movable member 610 moves in the front-rear direction while being guided by the guide rod 600. The speed switching lever 12 is operated by the operator such that the second movable member 620 moves in the front-rear direction. The second movable member 620 moves in the front-rear direction while being guided by the guide rod 600. The first spring 630 generates an elastic force such that the first movable member 610 moves (is urged) forward. The second spring 640 generates an elastic force such that the second movable member 620 moves (is urged) rearward.

Figure 9:
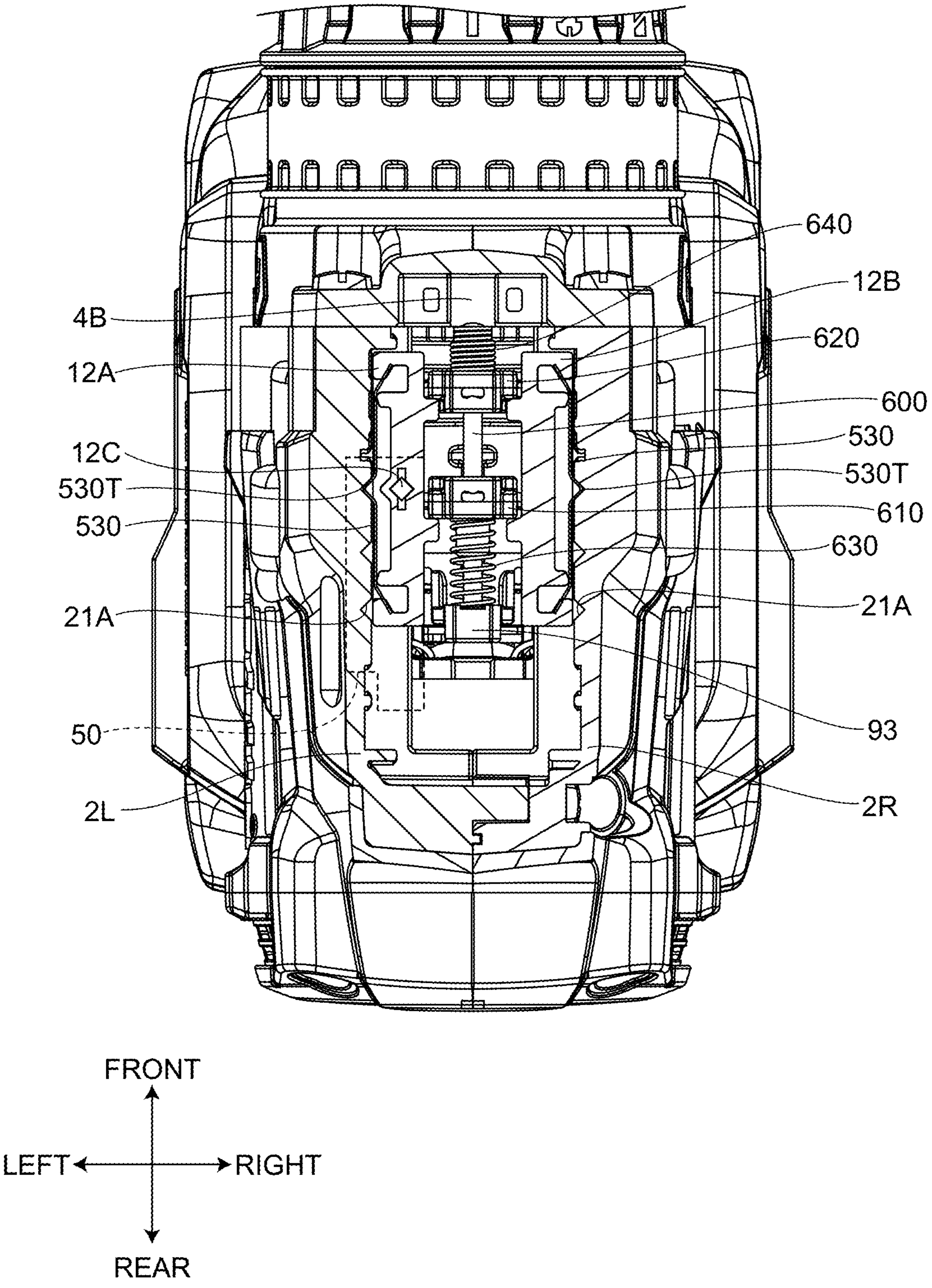
FIG. 9 is a top cross-sectional view illustrating a moving structure of a speed switching lever according to the embodiment.

FIG. 9 is a top cross-sectional view illustrating a moving structure of the speed switching lever 12 according to the embodiment. In order to switch the speed reduction mechanism 30 from the medium speed mode (speed "2") to the low speed mode (speed "1"), the operator operates (slides) the speed switching lever 12 against the elastic force (biasing force) of the second spring 640 such that the speed switching lever 12 moves forward. By moving the speed switching lever 12 forward, the second movable member 620 moves forward against the elastic force of the second spring 640. As illustrated in FIG. 9, a pair of walls 12A and 12B is provided on the lower surface of the speed switching lever 12. The walls 12A and 12B are disposed on the left and right sides of the guide rod 600, the first movable member 610, and the second movable member 620. Leaf springs 530 are fixed to the pair of walls 12A and 12B. By inserting a protrusions 530T of the leaf springs 530 into the recesses 21A provided at portions of the motor housing part 21, the speed switching lever 12 is positioned at the speed "1" position. The recesses 21A are provided at positions corresponding to the speed "1" position, the speed "2" position, and the speed "3" position.

In order to switch the speed reduction mechanism 30 from the medium speed mode (speed "2") to the high speed mode (speed "3"), the operator operates (slides) the speed switching lever 12 against the elastic force (biasing force) of the first spring 630 such that the speed switching lever 12 moves rearward. By inserting the protrusions 530T of the leaf springs 530 into the recesses 21A provided at a position corresponding to the speed "3" position, the speed switching lever 12 is positioned at the speed "3" position.

Similarly, in order to switch the speed reduction mechanism 30 from the low speed mode (speed "1") to the medium speed mode (speed "2"), the operator operates (slides) the speed switching lever 12 such that the speed switching lever 12 moves rearward. In order to switch the speed reduction mechanism 30 from the high speed mode (speed "3") to the medium speed mode (speed "2"), the operator operates (slides) the speed switching lever 12 such that the speed switching lever 12 moves forward. By inserting the protrusions 530T of the leaf springs 530 into the recesses 21A provided at a position corresponding to the speed "2" position, the speed switching lever 12 is positioned at the speed "2" position.

Figure 10:
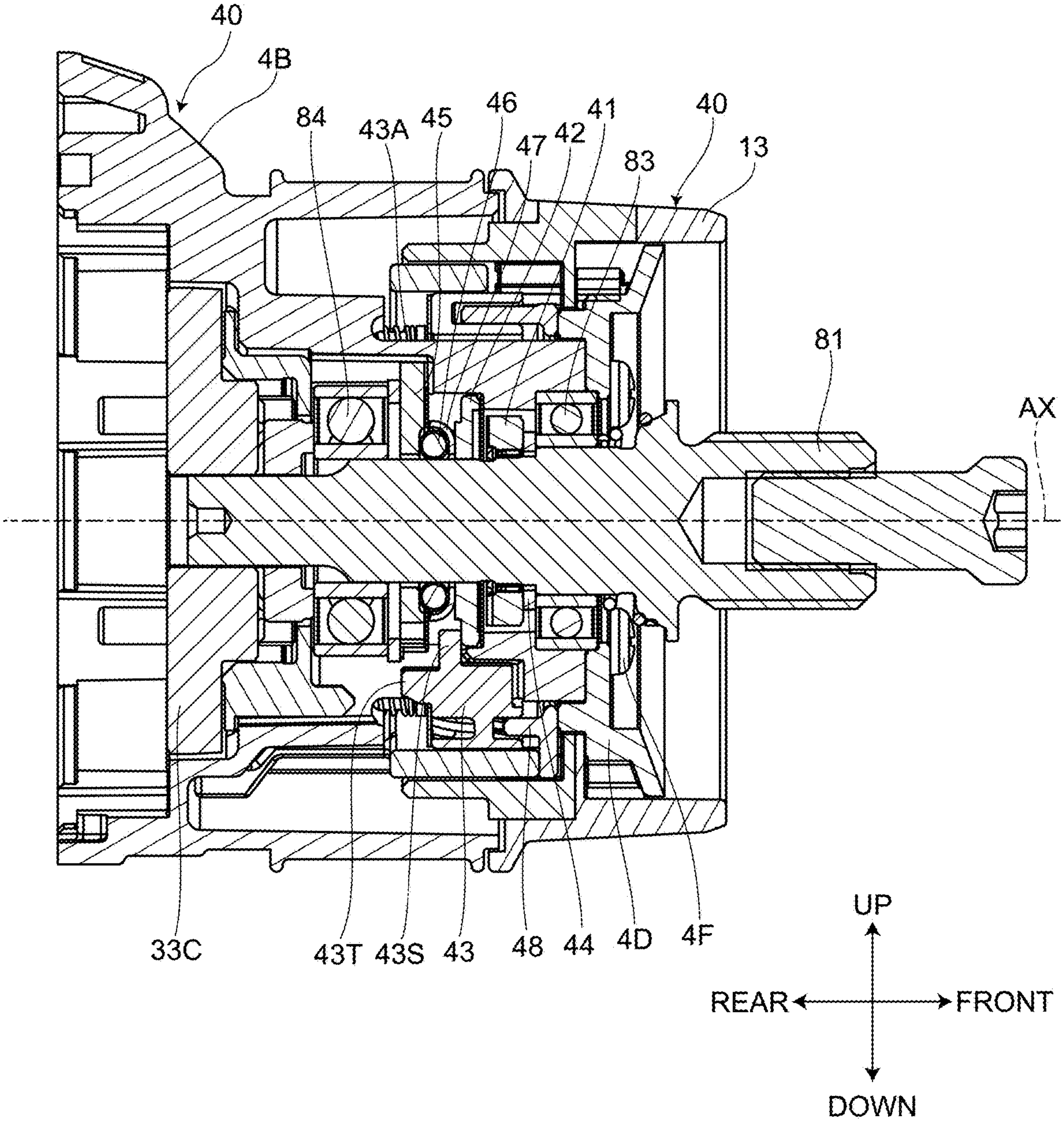
FIG. 10 is a cross-sectional view illustrating a hammer mechanism according to the embodiment.

FIG. 10 is a cross-sectional view illustrating the hammer mechanism 40 according to the embodiment. The hammer mechanism 40 is disposed around the spindle 81. The first cam 41 and the second cam 42 of the hammer mechanism 40 are both disposed inside the second casing 4B. In the front-rear direction, both the first cam 41 and the second cam 42 are disposed between the bearing 83 and the bearing 84.

The first cam 41 has a ring shape. The first cam 41 is disposed around the spindle 81. The first cam 41 is fixed to the spindle 81. The first cam 41 rotates together with the spindle 81. A cam gear is provided on a rear surface of the first cam 41. The first cam 41 is supported by a stop ring 44. The stop ring 44 is disposed around the spindle 81. In the front-rear direction, the stop ring 44 is disposed between the first cam 41 and the bearing 83.

The second cam 42 has a ring shape. The second cam 42 is disposed rearward of the first cam 41. The second cam 42 is disposed around the spindle 81. The second cam 42 is rotatable relative to the spindle 81. A cam gear is provided on a front surface of the second cam 42. The cam gear on the front surface of the second cam 42 meshes with the cam gear on the rear surface of the first cam 41. A tab is provided on a rear surface of the second cam 42.

In the front-rear direction, a support ring 45 is disposed between the second cam 42 and the bearing 84. The support ring 45 is disposed inside the second casing 4B. The support ring 45 is fixed to the second casing 4B. A plurality of steel balls 46 are disposed on a front surface of the support ring 45. A washer 47 is disposed between the steel balls 46 and the second cam 42. In a space defined by the support ring 45 and the washer 47, the second cam 42 is rotatable in a state in which forward-rearward movement is restricted.

The hammer switching ring 43 is switchable (changeable) between the hammering mode and the non-hammering mode. The mode switching ring 13 is coupled to the hammer switching ring 43 via a cam ring 48. The mode switching ring 13 and the cam ring 48 are integrally rotatable. The hammer switching ring 43 is movable in the front-rear direction. The hammer switching ring 43 has a projection 43T. The projection 43T is inserted into a guide hole provided in the second casing 4B. The projection 43T restricts rotation of the hammer switching ring 43. The hammer switching ring 43 is disposed around the first cam 41 and the second cam 42. In addition, the hammer switching ring 43 includes an opposing portion 43S that opposes a rear surface of the second cam 42. The opposing portion 43S protrudes radially inward from a rear portion of the hammer switching ring 43.

The hammer switching ring 43 is movable in the front-rear direction while being guided by a guide hole provided in the second casing 4B. The hammer switching ring 43 is pushed by the cam ring 48 along with rotation of the mode switching ring 13 to move rearward. The hammer switching ring 43 is forwardly biased by a spring 43A. When the mode switching ring 13 is returned and the pressing state by the cam ring 48 is released, the hammer switching ring 43 is pushed by the spring 43A to return to the front position. When the operator operates the mode switching ring 13, the hammer switching ring 43 moves in the front-rear direction. By moving the hammer switching ring 43 in the front-rear direction between an advanced position and a retracted position, which is more rearward than the advanced position, the mode changes between the hammering mode and the non-hammering mode. By operating the mode switching ring 13, the hammering mode and the non-hammering mode.

The hammering mode includes the state in which rotation of the second cam 42 is restricted (blocked). When the hammer switching ring 43 moves to the advanced position, rotation of the second cam 42 is restricted (blocked). The non-hammering mode includes the state in which rotation of the second cam 42 is permitted. When the hammer switching ring 43 moves to the retracted position, rotation of the second cam 42 is permitted.

In the hammering mode, at least a portion of the hammer switching ring 43, which has moved to the advanced position by being pushed by the spring 43A, makes contact with the second cam 42. When the hammer switching ring 43 and the second cam 42 come into contact with each other, rotation of the second cam 42 is restricted (blocked). When the hammer switching ring 43 moves to the advanced position, the tab on the rear surface of the second cam 42 and the opposing portion 43S of the hammer switching ring 43 come into contact with each other. This restricts rotation of the second cam 42. In the state in which rotation of the second cam 42 is restricted, when the motor 6 is driven, the first cam 41 fixed to the spindle 81 rotates while making contact with the cam gear of the second cam 42. Thereby, the spindle 81 is rotated while hammering in the front-rear direction.

In the non-hammering mode, the hammer switching ring 43, which has moved to the retracted position by being pushed by the cam ring 48, is spaced apart from the second cam 42. When the hammer switching ring 43 has moved to the retracted position, the opposing portion 43S of the hammer switching ring 43 is spaced apart from the second cam 42. Owing to the hammer switching ring 43 being spaced apart from the second cam 42, rotation of the second cam 42 is permitted. In the state in which rotation of the second cam 42 is permitted, when the motor 6 is driven, the second cam 42 rotates together with the first cam 41 and the spindle 81. Thereby, the spindle 81 is rotated without hammering in the front-rear direction.

Element and Lead Wire

Figure 11:
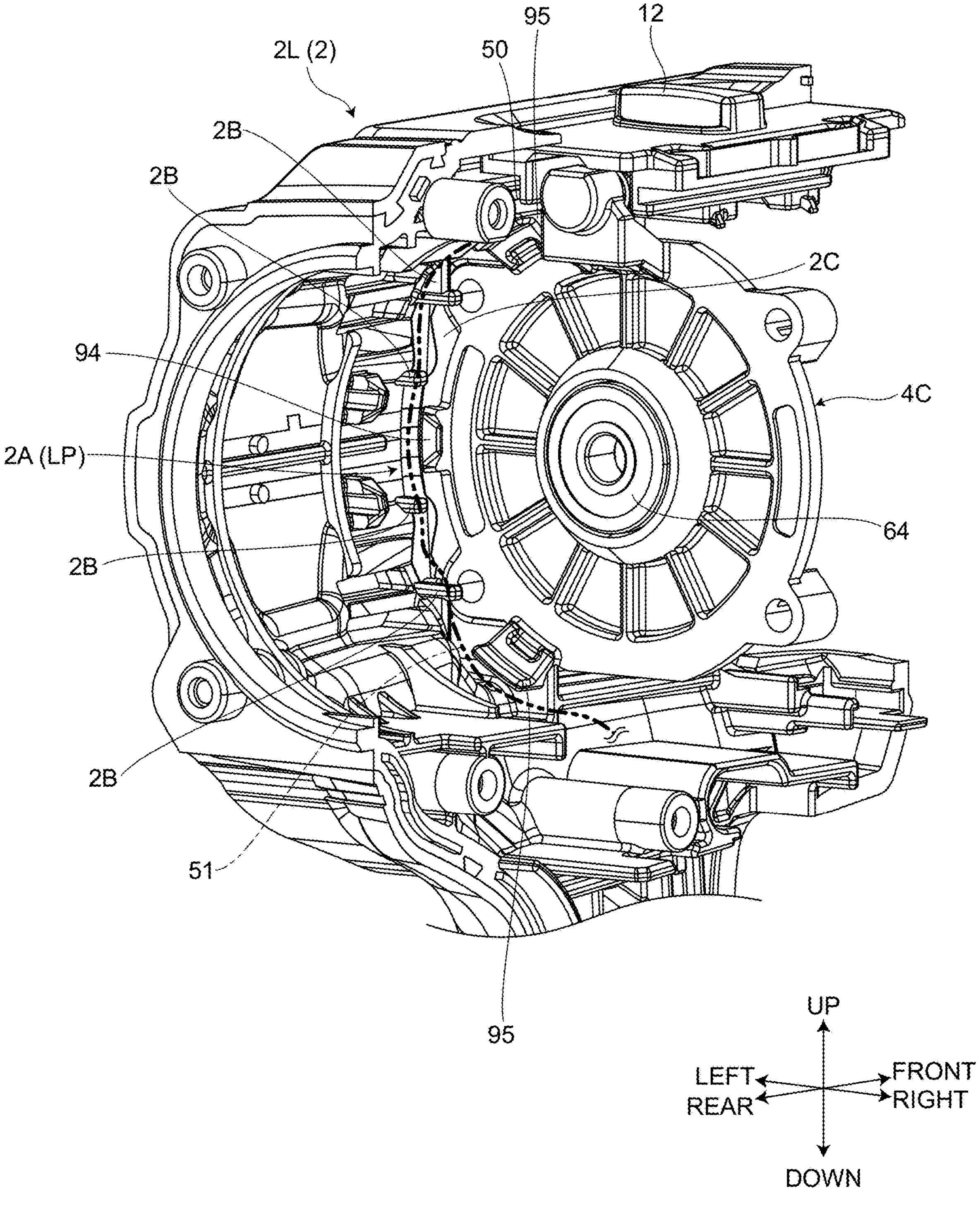
FIG. 11 is a rear perspective view illustrating a left housing and the motor bracket according to the embodiment.

FIG. 11 is a rear perspective view illustrating the left housing 2L and the motor bracket 4C according to the embodiment. As illustrated in FIG. 11, the driver drill 1 includes: an element 50; and a lead wire 51 connected to the element 50. The element 50 includes a sensor that detects switching of the speed reduction ratio by the speed switching lever 12.

As illustrated in FIG. 9, a detection piece 12C is provided on the wall 12A of the speed switching lever 12. The element 50 is disposed immediately below the wall 12A. In the embodiment, the detection piece 12C is a permanent magnet, and the element 50 is a magnetic sensor. As illustrated in FIG. 6, the element 50 is formed as a circuit board incorporating a magnetic sensor. The lead wire 51 is connected to the circuit board. The element 50 detects a magnetic field generated by the detection piece 12C. The element 50 is connected to the controller 17 via the lead wire 51. The element 50 outputs a detection signal of the magnetic field to the controller 17. The position of the detection piece 12C is different according to positions of the speed switching lever 12; that is, when the speed switching lever 12 is at position of the low speed mode (speed "1"), the speed switching lever 12 is at the position of the medium speed mode (peed "2"), and when the speed switching lever 12 is at the position of the high speed mode (peed "3"). The detection signal output from the element 50 varies according to a position of the detection piece 12C. The controller 17 detects which mode in which the speed switching lever 12 is placed, based on a change in the detection signal.

The element 50 is provided above the motor 6 or the speed reduction mechanism 30. The element 50 is positioned between the speed switching lever 12 and the speed reduction mechanism 30 in the up-down direction. The element 50 is fixed to the left housing 2L. As illustrated in FIG. 11, the lead wire 51 is connected to the element 50 and extends more downward than the motor 6 or the speed reduction mechanism 30. One end of the lead wire 51 is connected to the element 50, and the other end of the lead wire 51 is connected to the controller 17. The lead wire 51 passes downward from an upper portion of the left housing 2L along an inner surface of the left housing 2L through the left side of the motor housing part 21 (through a space in which the motor 6, the motor bracket 4C, and the speed reduction mechanism 30 are disposed). The lead wire 51 extends to the controller 17 provided in (on) the battery holding part 23, which is disposed downward of the motor 6.

In the embodiment, a passage LP, through which the lead wire 51 passes, is provided between the motor 6 and the speed reduction mechanism 30 in the front-rear direction. Specifically, the motor bracket 4C is disposed between the motor 6 and the speed reduction mechanism 30. The passage LP is provided between the motor bracket 4C and the housing 2 (left housing 2L) surrounding the outer circumference of the motor bracket 4C. The passage LP is a linear region, which is defined by the motor bracket 4C and the left housing 2L and extends along the inner surface of the left housing 2L.

Figure 12:
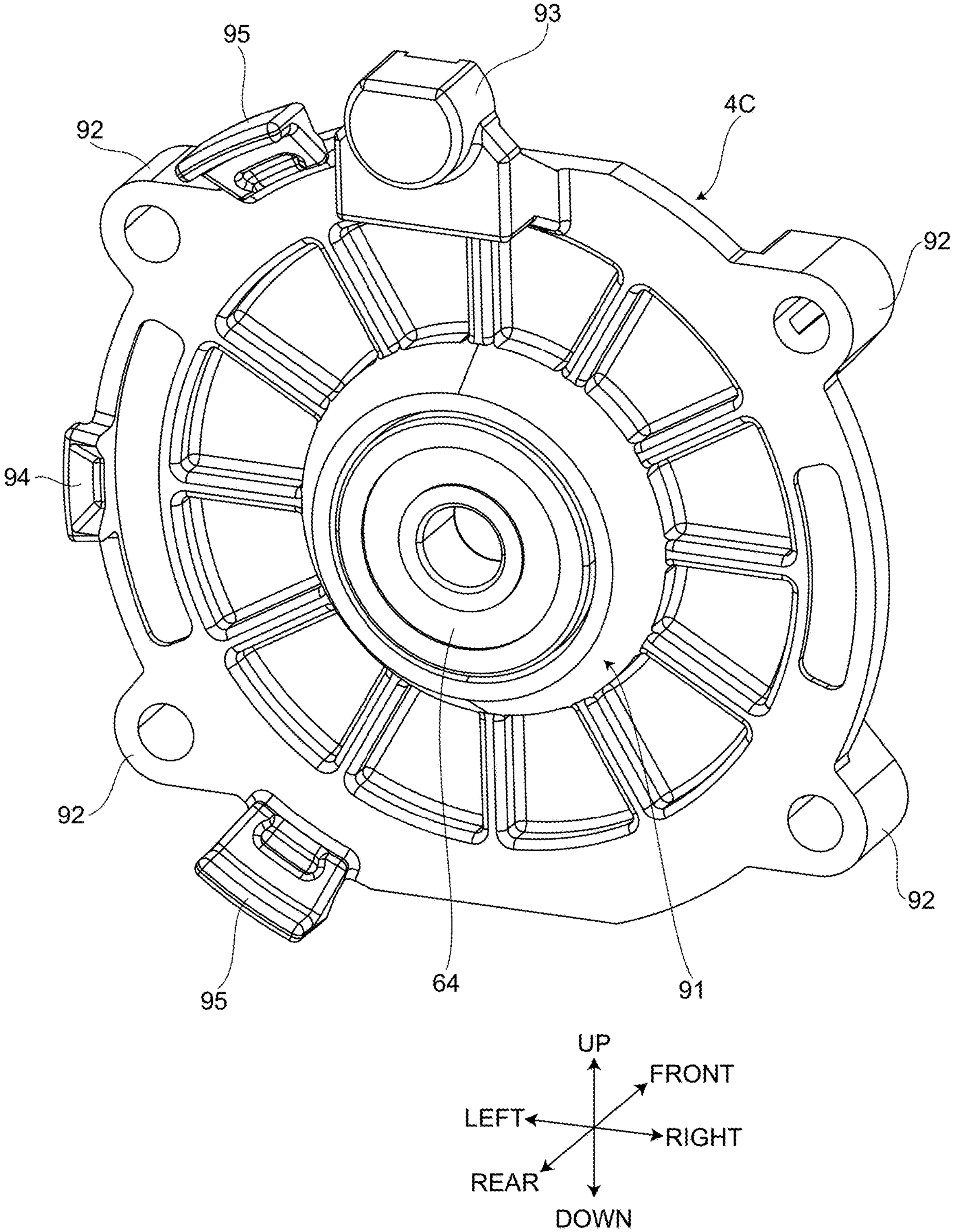
FIG. 12 is a rear perspective view illustrating the motor bracket according to the embodiment.
Figure 13:
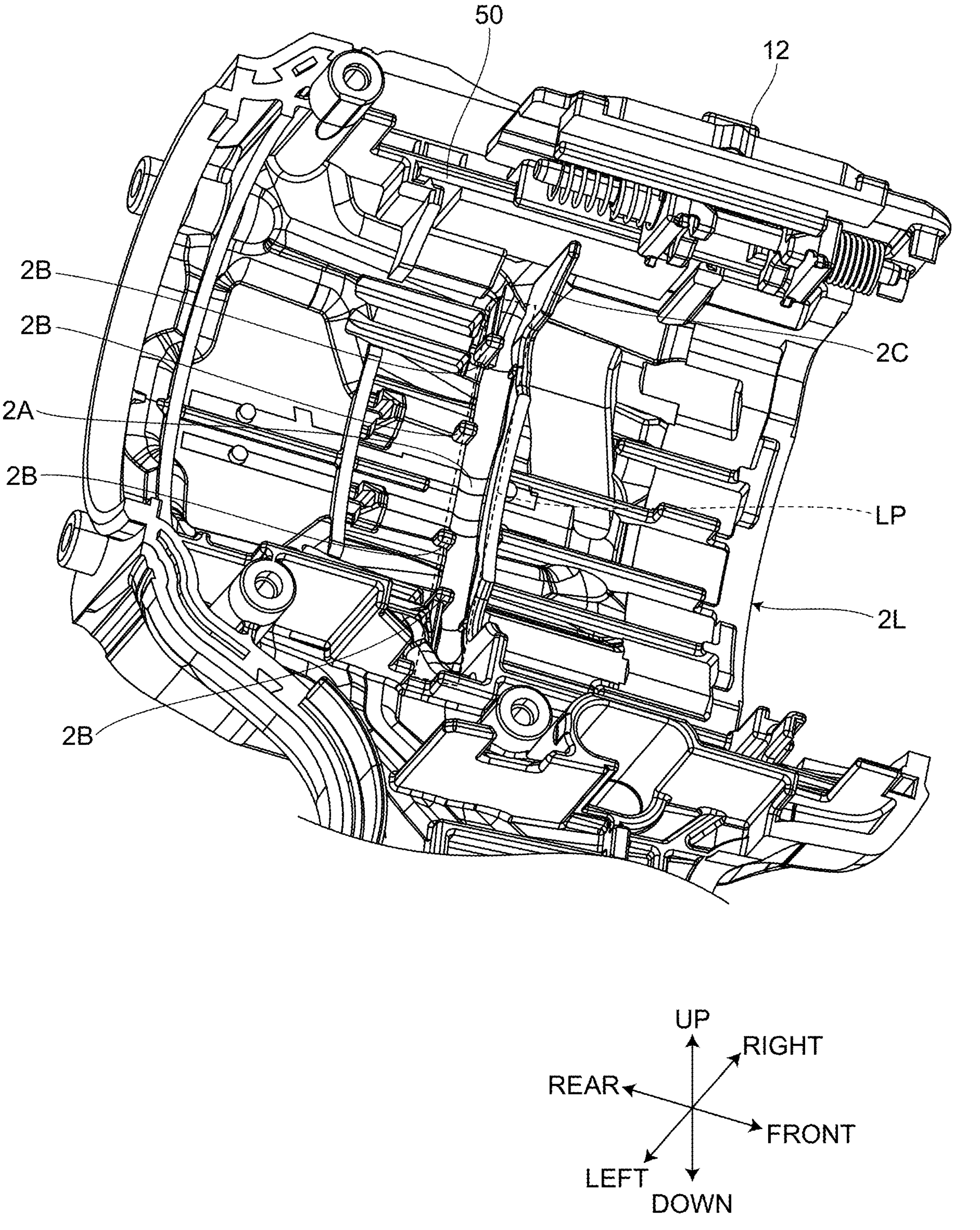
FIG. 13 is a perspective view illustrating a part of the left housing according to the embodiment.

FIG. 12 is a rear perspective view illustrating the motor bracket 4C according to the embodiment. FIG. 13 is a perspective view illustrating a part of the left housing 2L according to the embodiment. As illustrated in FIG. 13, the inner surface of the housing 2 has a recess 2A in which the lead wire 51 is disposed. The recess 2A is provided in the left housing 2L. At least a portion of the passage LP is constituted with the recess 2A. The recess 2A is a recessed region formed in (on) the inner surface of the left housing 2L. The recess 2A extends in the up-down direction from an upper portion to a lower portion of the motor housing part 21 of the left housing 2L along the inner surface of the left housing 2L. The width of the recess 2A in the front-rear direction is set corresponding to the line width of the lead wire 51, and a portion of the lead wire 51 is disposed in the recess 2A. A rear edge of the recess 2A includes a plurality of guide projections 2B. A front edge of the recess 2A includes a support wall 2C that supports a left side surface of the motor bracket 4C. The plurality of guide projections 2B rises from the inner surface of the left housing 2L. The plurality of guide projections 2B is disposed spaced apart in the up-down direction along the recess 2A. The number of the guide projections 2B is four. The support wall 2C rises from the inner surface of the left housing 2L. The leading end of the support wall 2C are formed corresponding to the shape of the left side surface of the motor bracket 4C in a recess and protrusion relation, and the left side surface of the motor bracket 4C is fitted to the leading end of the support wall 2C.

As illustrated in FIG. 12, the motor bracket 4C is an annular plate member. The bearing 64 is attached to a central opening 91 of the motor bracket 4C. At four corners of the outer circumference of the motor bracket 4C, mounting parts 92 each having a screw insertion hole are provided. The motor bracket 4C is fixed to fixing parts 4M (refer to FIG. 5) at a rear end portion of the first casing 4A by screws 4E (refer to FIG. 4) passing through the screw insertion holes of the mounting parts 92. The motor bracket 4C functions as a rear-side holding plate of the speed reduction mechanism 30 in the first casing 4A. The motor bracket 4C functions as a positioning member that positions the motor 6 and the speed reduction mechanism 30. That is, the motor bracket 4C functions as a positioning member such that the rotor shaft 63 passing through the inside of the bearing 64 coincides with the central axis of the speed reduction mechanism 30. At an upper end portion of the motor bracket 4C, a rod support 93 is provided. The rod support 93 has a recess into which a rear end portion of the guide rod 600 is inserted.

In the embodiment, the motor bracket 4C functions as a holding member that holds the lead wire 51. At a portion of the outer circumferential surface, the motor bracket 4C comes into contact with the lead wire 51. The motor bracket 4C has protrusions (94, 95) protruding toward the recess 2A on the outer circumference of the motor bracket 4C. The protrusions (94, 95) are provided on a left outer circumferential portion of the motor bracket 4C and faces the left housing 2L. The protrusions includes a first protrusion 94 and second protrusions 95 in the circumferential direction of the motor bracket 4C. In the embodiment, one first protrusion 94 and two second protrusions 95 are provided.

The first protrusion 94 is disposed on the side surface of the motor bracket 4C. The first protrusion 94 is disposed on the left side surface of the motor bracket 4C substantially at the center of the motor bracket 4C in the up-down direction. The first protrusion 94 is positioned leftward of the rotation axis (rotor shaft 63) of the motor 6 positioned at the center of the motor bracket 4C. The second protrusions 95 may be disposed, on the motor bracket 4C, more upward or downward than the first protrusion 94. One of the second protrusions 95 is provided on the outer circumference of the motor bracket 4C at an upper position than the first protrusion 94, and the other is provided at a lower position than the first protrusion 94. The first protrusion 94 and the second protrusions 95 are each provided on the outer circumferential portion of a rear surface of the motor bracket 4C and each protrude rearward from the motor bracket 4C. As illustrated in FIG. 11, in the state where the motor bracket 4C is attached to the support wall 2C of the left housing 2L, the positions of the first protrusion 94 and the second protrusions 95 in the front-rear direction correspond to the position at which the recess 2A is formed. The first protrusion 94 and the second protrusions 95 each protrude radially outward from the outer circumferential portion of the rear surface of the motor bracket 4C. Therefore, the first protrusion 94 and the second protrusions 95 each protrude toward the recess 2A. The first protrusion 94 and the second protrusions 95 face the recess 2A in the radial direction of the motor bracket 4C.

Figure 14:
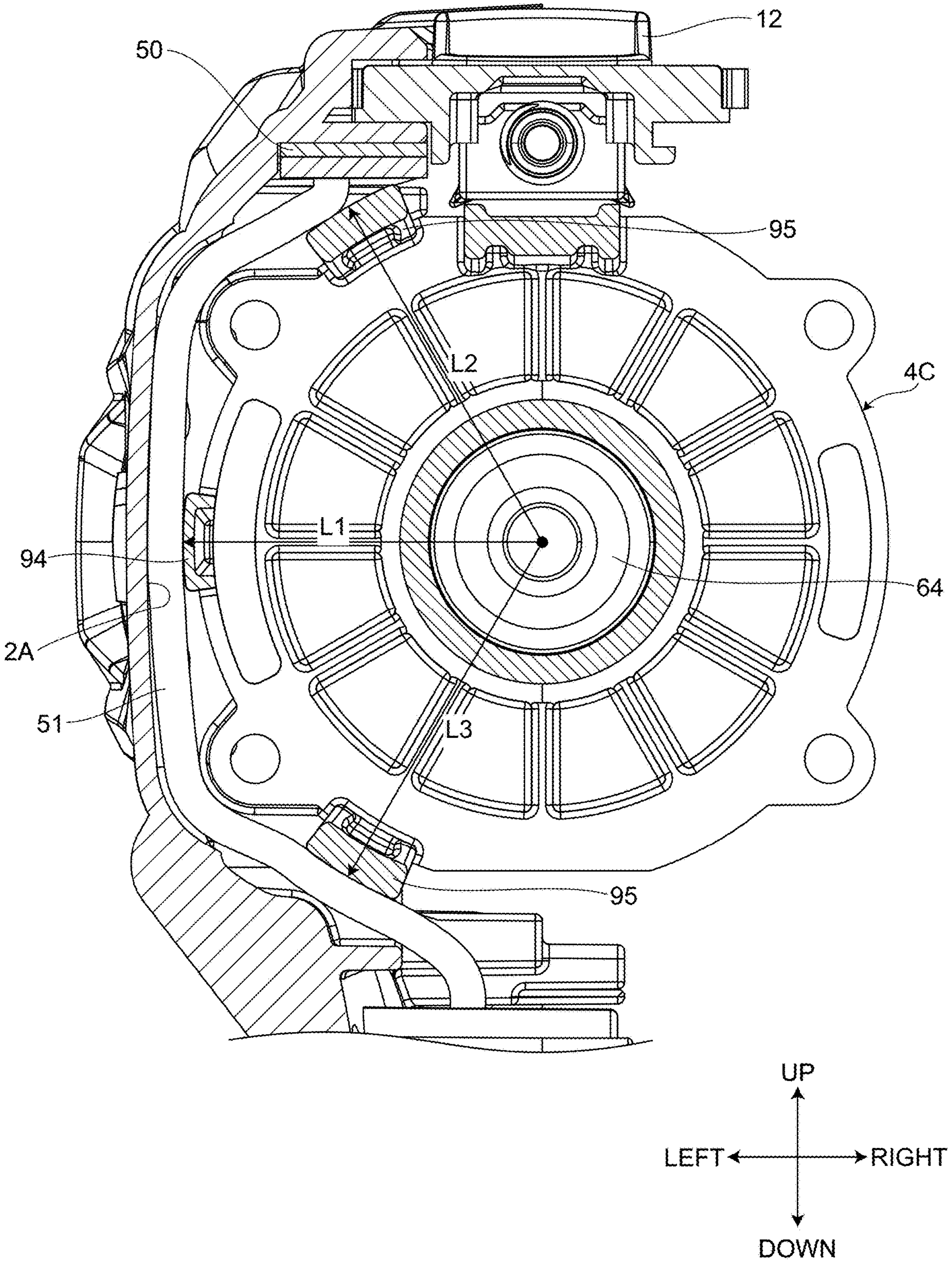
FIG. 14 is a rear-to-front cross-sectional arrow view illustrating a passage of a lead wire according to the embodiment.

FIG. 14 is a rear-to-front cross-sectional arrow view illustrating the passage LP of the lead wire 51 according to the embodiment. As illustrated in FIG. 14, in the radial direction of the rotation axis of the rotor shaft 63 of the motor 6, a distance L1 from the rotation axis to a leading end of the first protrusion 94 is shorter than distances L2 and L3 from the rotation axis to leading ends of the second protrusions 95. As illustrated in FIG. 12, the first protrusion 94 and the second protrusions 95 protrude radially outward from the outer circumferential portion of the motor bracket 4C, and the protrusion amount of the first protrusion 94 is smaller than the protrusion amount of each of the second protrusions 95. Accordingly, the distance L1 is shorter than the distances L2 and L3. At the position where the first protrusion 94 is formed, the position of the inner surface of the left housing 2L (the inner bottom surface of the recess 2A) can be brought closer to the first protrusion 94 by the decrease of the distance L1. As a result, the position of the outer surface of the left housing 2L can be brought closer to the center side in the radial direction, making it possible to suppress the width dimension of the housing 2 in the motor housing part 21.

The lead wire 51 is disposed so as to be fitted into the recess 2A, and then held from the right by the respective protrusions (the first protrusion 94 and the second protrusions 95) of the motor bracket 4C. Thereby, the lead wire 51 is sandwiched between the housing 2 and the motor bracket 4C. In other words, the lead wire 51 is held from the outside by the housing 2. The lead wire 51 is held from the inside by the motor bracket 4C. The inner surface (recess 2A) of the left housing 2L is in contact with the lead wire 51 from the left side, and the respective protrusions (first protrusion 94 and second protrusions 95) are in contact with the lead wire 51 from the right side. This configuration makes it possible to suppress the positional displacement (uplift) of the lead wire 51 in the radial direction from the inner surface of the left housing 2L. In addition, the lead wire 51 is sandwiched between the plurality of guide projections 2B and the support wall 2C of the left housing 2L in the front-rear direction. The plurality of guide projections 2B are in contact with the lead wire 51 from the rear side, while the support wall 2C is in contact with the lead wire 51 from the front side. This configuration suppresses the positional displacement of the lead wire 51 in the front-rear direction on the inner surface of the left housing 2L.

Handle

Figure 15:
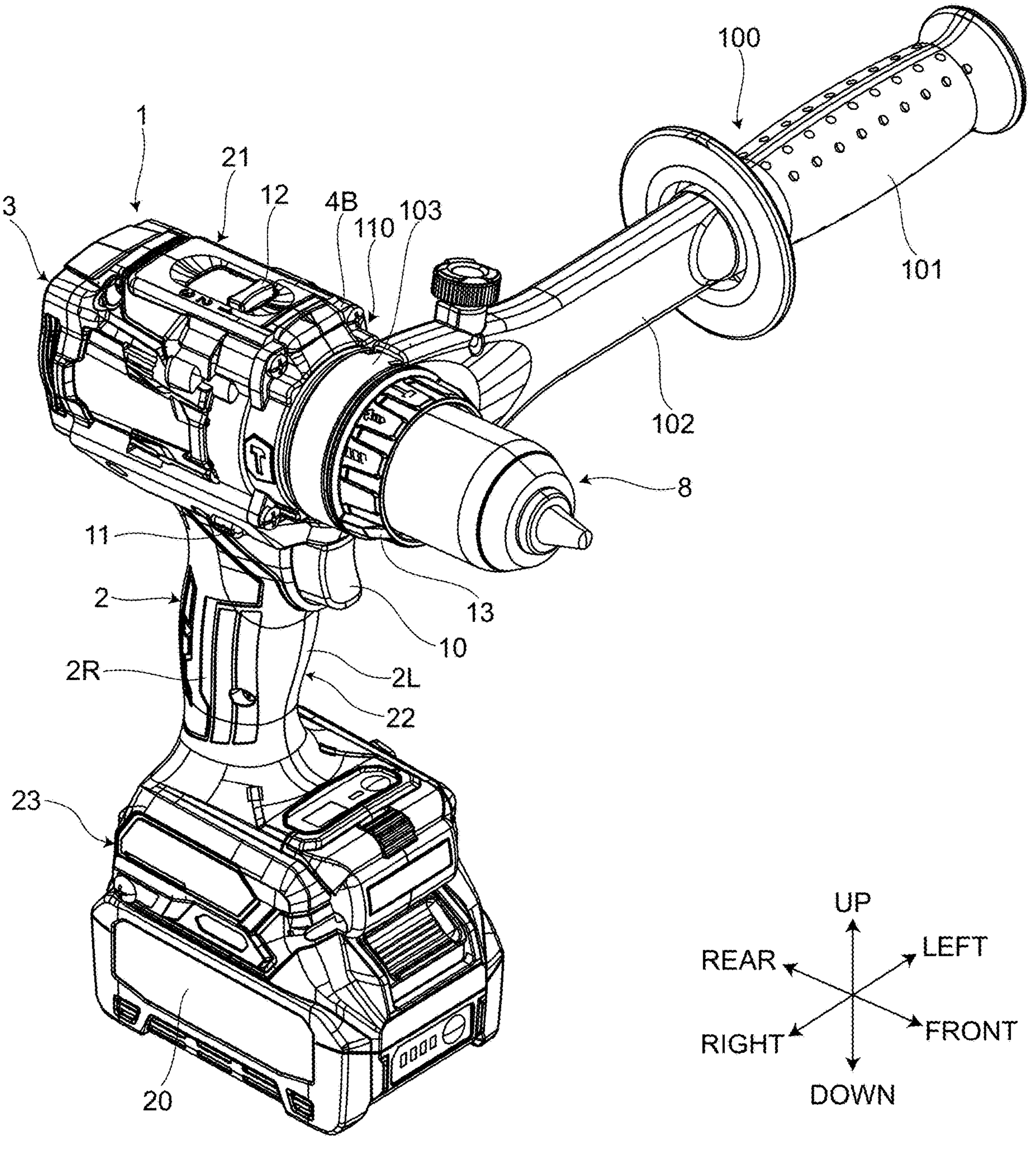
FIG. 15 is a front perspective view illustrating a driver drill with a handle attached according to the embodiment.
Figure 16:
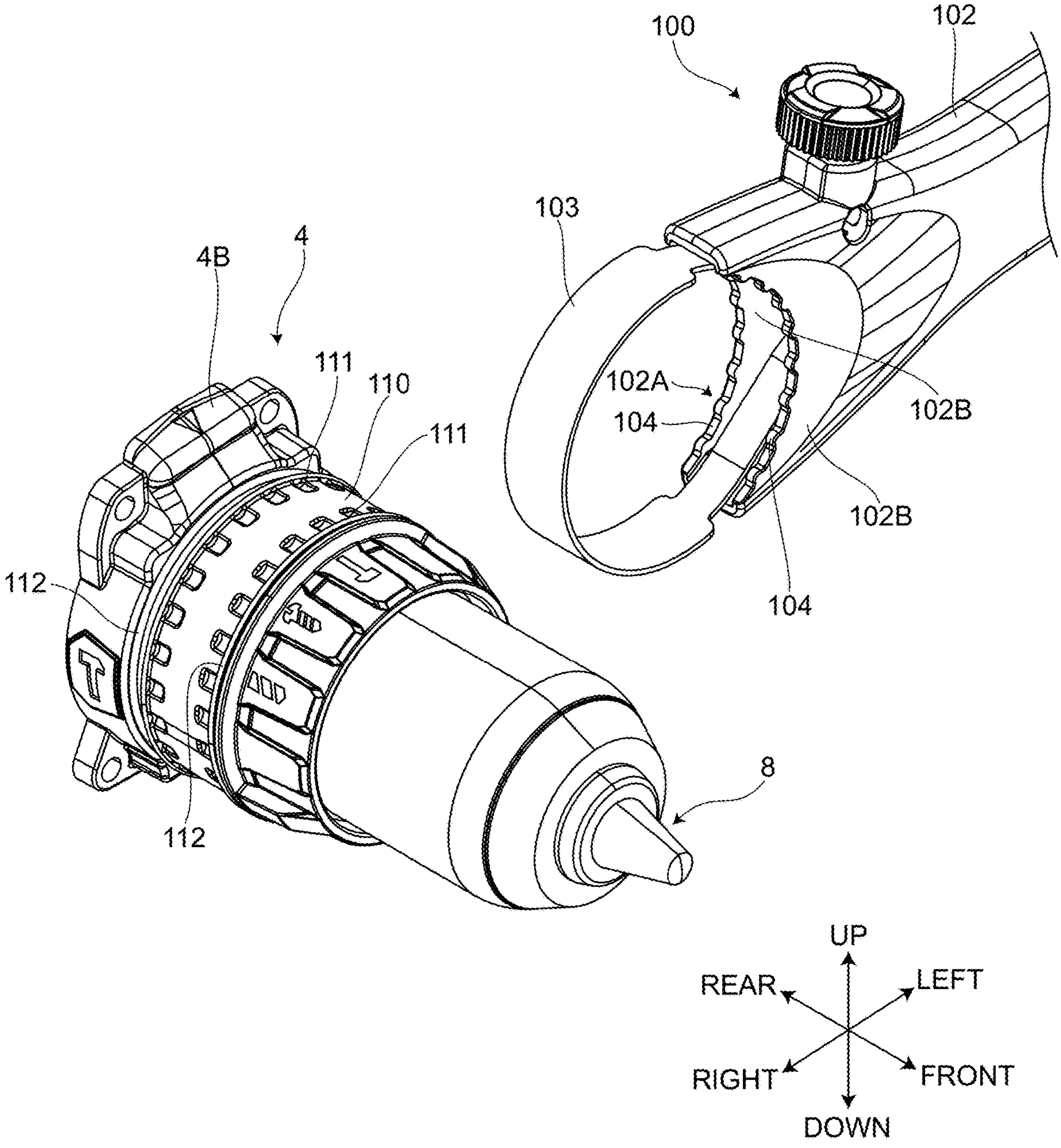
FIG. 16 is a perspective view illustrating an attachment part of the handle according to the embodiment.
Figure 17:
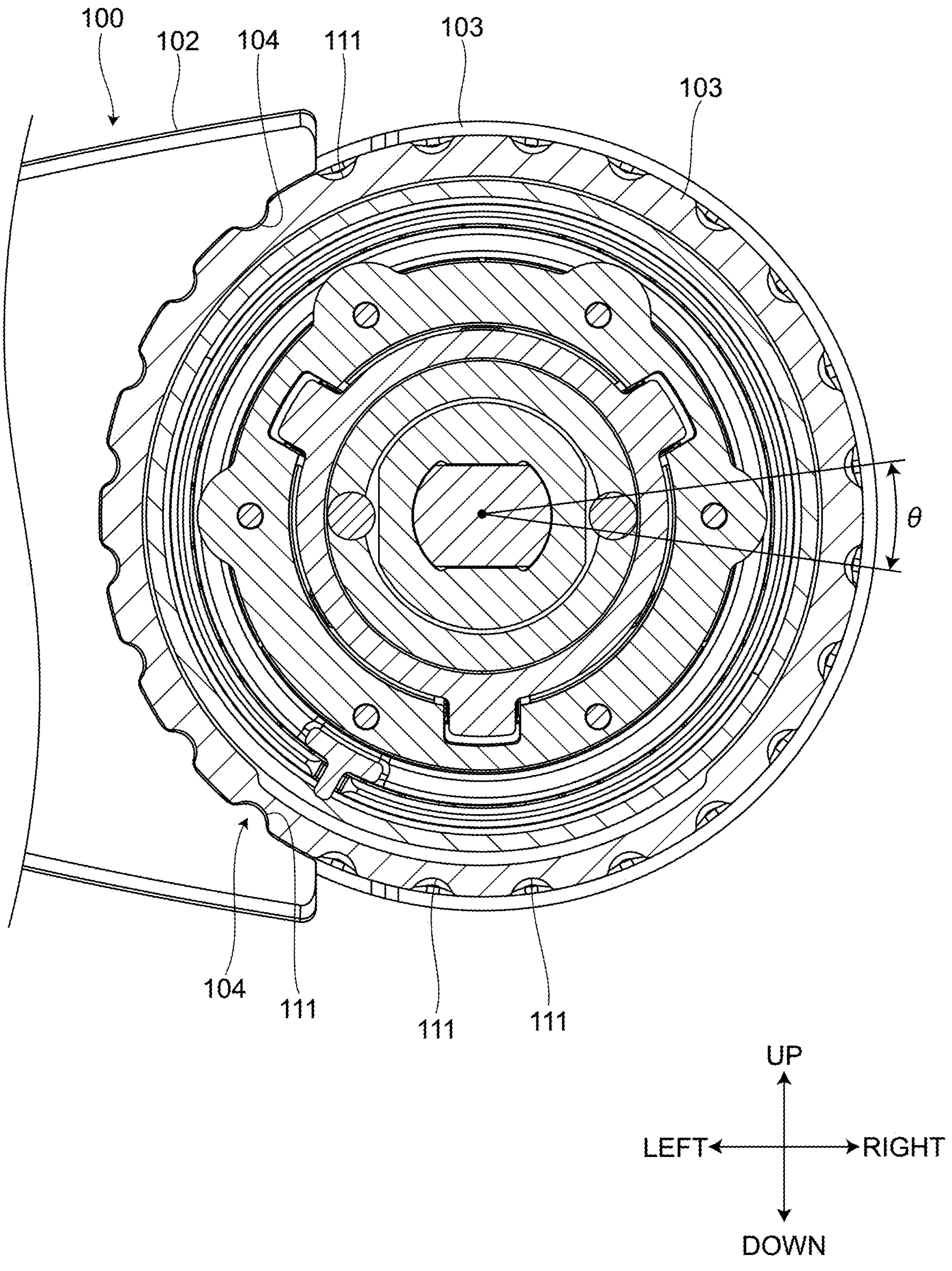
FIG. 17 is a rear-to-front cross-sectional arrow view illustrating engagement between the handle and the attachment part according to the embodiment.

FIG. 15 is a front perspective view illustrating the driver drill 1 with a handle 100 attached according to the embodiment. FIG. 16 is a perspective view illustrating an attachment part 110 of the handle 100 according to the embodiment. FIG. 17 is a rear-to-front cross-sectional arrow view illustrating engagement between the handle 100 and the attachment part 110 according to the embodiment.

As illustrated in FIGS. 15, 16, and 17, the driver drill 1 can be used with the handle 100 detachably attached thereto. By gripping the grip part 22 with one hand and gripping the handle 100 with the other hand, the operator can stably and firmly hold the driver drill 1 during work. The handle 100 can be attached to the housing 2 or the casing 4. In the embodiment, the handle 100 can be attached to and detached from the second casing 4B of the casing 4. The second casing 4B is provided with the attachment part 110 for attachment of the handle 100.

The handle 100 includes a handle grip 101, an arm 102, and a band 103. The arm 102 is attached to an end of the handle grip 101. The arm 102 is a hollow tubular member made of metal. The attachment part 110 has a circular cross section when viewed in the front-rear direction. An end portion 102A of the arm 102 is formed in a recessed arc shape along the outer circumferential portion of the attachment part 110 (second casing 4B). The end portion 102A of the arm 102 is open. The band 103 is a wide belt-shaped member. Both ends of the band 103 are inserted into the opening of the end portion 102A of the arm 102, so as to be connected to the handle grip 101 inside the arm 102. This forms the band 103 in a loop shape. The handle grip 101 is rotatable about a long axis (central axis) with respect to the arm 102. When the handle grip 101 is twisted so as to rotate in one direction, the handle grip 101 pulls the band 103 into the arm 102 owing to the rotation to reduce a loop diameter of the band 103. When the handle grip 101 is twisted so as to rotate in the other direction, the handle grip 101 expands the band 103 from the arm 102 owing to the rotation to increase the loop diameter of the band 103. The attachment part 110 of the second casing 4B can be disposed inside the loop of the band 103 with the loop diameter increased. By reducing the loop diameter in a state where the attachment part 110 is disposed inside the loop of the band 103, the band 103 pulls and tightens the attachment part 110 toward the end portion 102A of the arm 102. Tightened by the band 103, the arm 102 is fixed to the attachment part 110.

The attachment part 110 of the second casing 4B and the end portion 102A of the arm 102 can be engaged with each other. The engagement suppresses positional displacement of the arm 102 in the circumferential direction of the attachment part 110. The attachment part 110 is provided with a plurality of engagement recesses 111. The engagement recesses 111 are formed at equiangular intervals over the entire circumference of the attachment part 110 in the circumferential direction. The engagement recesses 111 are provided in two rows at a front end portion of the attachment part 110 and a rear end portion of the attachment part 110. On both outer sides of the two rows of engagement recesses 111, flanges 112 are provided to rise outward in the radial direction. In other words, the attachment part 110 is formed, between the pair of flanges 112, to have an outer diameter smaller than the diameters of the flanges 112. The end portion 102A of the arm 102 is attached between the pair of flanges 112. The engagement recess 111 and the pair of flanges 112 suppress positional displacement of the arm 102 in the front-rear direction.

The end portion 102A of the arm 102 is provided with engagement protrusions 104 to be engaged with the engagement recesses 111. The engagement protrusions 104 are formed in two rows in the front-rear direction corresponding to the engagement recesses 111 in two rows in the front-rear direction. The two rows of engagement protrusions 104 are formed at an end of the front wall 102B and an end of the rear wall 102B, which define the opening of the arm 102. The engagement protrusions 104 in each row are formed in the circumferential direction of the end portion 102A. The engagement protrusions 104 are formed in a range from one end to the other end of the end portion 102A of the arm 102. The engagement protrusions 104 are engaged with the engagement recesses 111 in one row disposed in the circumferential direction of the attachment part 110. The two rows of the engagement protrusions 104 are fitted into the two rows of the engagement recesses 111, thereby engaging the arm 102 and the attachment part 110 to each other.

As illustrated in FIG. 17, the engagement recesses 111 are disposed on the entire circumference of the attachment part 110 at equiangular intervals of a predetermined angle θ. In the embodiment, the angle θ is 15 degrees. Twenty-four engagement recesses 111 formed on the entire circumference of the attachment part 110 at intervals of 15 degrees. Similarly to the engagement recesses 111, the engagement protrusions 104 of the end portion 102A of the arm 102 are formed at equiangular intervals of the angle θ. In the embodiment, there are eight engagement protrusions 104 per row. The arm 102 is engaged with the attachment part 110 by a total of 16 positions (8×2 rows) of engagement protrusions 104 and engagement recesses 111. The handle 100 can be attached to the attachment part 110 in any direction with an angle θ as a unit.

At the time of attaching the handle 100, the operator disposes the attachment part 110 of the second casing 4B inside the loop of the band 103 with the loop diameter of the band 103 increased. The operator brings the end portion 102A of the arm 102 into contact with the attachment part 110 so as to fit the engagement protrusions 104 into the engagement recesses 111. The operator twists the handle grip 101 in one direction to reduce the loop diameter of the band 103. The fastening force of the band 103 maintains a state in which the end portion 102A of the arm 102 is pressed against the attachment part 110. With this configuration, the handle 100 is attached to the attachment part 110. When removing the handle 100 or changing the attachment position, it is only necessary to twist the handle grip 101 in the other direction to increase the loop diameter of the band 103 so as to release the state in which the end portion 102A of the arm 102 is pressed against the attachment part 110.

Effects

In the embodiment as described above, the driver drill 1 may include: the motor 6; the output part 8 provided forward of the motor 6 and driven by the motor 6; the speed reduction mechanism 30 disposed between the motor 6 and the output part 8; the motor bracket 4C disposed between the motor 6 and the speed reduction mechanism 30; the housing 2 that houses the motor 6 and the motor bracket 4C; the element 50 provided above the motor 6 or the speed reduction mechanism 30; and the lead wire 51 connected to the element 50 and extending more downward than the motor 6 or the speed reduction mechanism 30. The lead wire 51 may be sandwiched between the housing 2 and the motor bracket 4C.

With the above configuration, the lead wire 51 connected to the element 50 is appropriately held while suppressing an increase in the external dimension.

In the embodiment, the driver drill 1 may include, on the inner surface of the housing 2, the recess 2A in which the lead wires 51 are disposed.

With the above configuration, the positional displacement of the lead wire 51 is effectively suppressed.

In the embodiment, the driver drill 1 may have the protrusions (94, 95) protruding toward the recess 2A on the outer circumference of the motor bracket 4C.

With the above configuration, the positional displacement of the lead wire 51 is more effectively suppressed between the recess 2A and the protrusions (94, 95).

In the embodiment, the protrusion may include the first protrusion 94 and the second protrusion 95 in the circumferential direction of the motor bracket 4C. In the radial direction of the rotation axis (rotor shaft 63) of the motor 6, the distance from the rotation axis to the leading end of the first protrusion 94 may be shorter than the distance from the rotation axis to the leading end of the second protrusion 95.

With the above configuration, even with the protrusions, the external shape of the housing 2 is less likely to be enlarged at the formation position of the first protrusion 94, making it possible to suppress enlargement of the driver drill 1.

In the embodiment, the first protrusion 94 may be disposed on the side surface of the motor bracket 4C. The second protrusion 95 may be disposed, on the motor bracket 4C, more upward or downward than the first protrusion 94.

With the above configuration, the width dimension of the driver drill 1 is suppressed.

In the embodiment, the driver drill 1 may further include a hammer mechanism 40 that hammers the output part 8.

With the above configuration, drilling can be performed using hammering. Even in the case of hammering, positional displacement of the lead wire 51 due to hammering is effectively suppressed.

In the embodiment, the speed reduction mechanism 30 may be a multi-stage speed changer. The driver drill 1 may further include a speed switching lever 12 disposed in an upper portion of the housing 2 to switch a speed reduction ratio of the speed reduction mechanism 30. The element 50 may include a sensor that detects switching of the speed reduction ratio by the speed switching lever 12.

With the above configuration, the lead wire 51 connected to the sensor in the upper portion of the housing 2 is appropriately held.

In the embodiment, the driver drill 1, which is a hammer driver drill, may include: the motor 6; the output part 8 provided forward of the motor 6 and driven by the motor 6; the speed reduction mechanism 30 disposed between the motor 6 and the output part 8; the hammer mechanism 40 disposed between the speed reduction mechanism 30 and the output part 8; the motor bracket 4C disposed between the motor 6 and the speed reduction mechanism 30; the housing 2 that houses the motor 6 and the motor bracket 4C; the element 50 provided above the motor 6 or the speed reduction mechanism 30; and the lead wire 51 connected to the element 50 and extending more downward than the motor 6. The lead wire 51 may be held by the motor bracket 4C.

With the above configuration, the lead wire 51 connected to the element 50 is appropriately held while suppressing an increase in the external dimension. Even in the case of hammering, positional displacement of the lead wire 51 due to hammering is effectively suppressed.

In the embodiment, the driver drill 1, which is a hammer driver drill, may include: the motor 6; the output part 8 provided forward of the motor 6 and driven by the motor 6; the speed reduction mechanism 30 disposed between the motor 6 and the output part 8; the hammer mechanism 40 disposed between the output part 8 and the speed reduction mechanism 30; the housing 2 that houses the motor 6 and the speed reduction mechanism 30; the element 50 provided above the motor 6 and the speed reduction mechanism 30; and the controller 17 provided downward of the motor 6 and connected to the element 50 via the lead wire 51. The passage LP through which the lead wire 51 passes may be provided between the motor 6 and the speed reduction mechanism 30 in the front-rear direction.

With the above configuration, the lead wire 51 connected to the element 50 is appropriately held while suppressing an increase in the external dimension. Even in the case of hammering, positional displacement of the lead wire 51 due to hammering is effectively suppressed.

In the embodiment, the driver drill 1, which is a hammer driver drill, may further include: the motor bracket 4C disposed between the motor 6 and the speed reduction mechanism 30 to position the motor 6 and the speed reduction mechanism 30. The passage LP may be provided between the motor bracket 4C and the housing 2 surrounding the outer circumference of the motor bracket 4C.

With the above configuration, the passage LP of the lead wire 51 is constructed without increasing the number of components.

Other Embodiments

In the above-described embodiment, the battery pack 20 attached to the battery mounting part 5 is used as the power source of the driver drill 1. A commercial power source (AC power source) may be used as a power source of the driver drill 1.

In the above-described embodiment, the element 50 to which the lead wire 51 is connected includes the sensor that detects the switching of the speed reduction ratio by the speed switching lever 12. The element 50 to which the lead wire 51 is connected may be a sensor other than the sensor that detects the switching of the speed reduction ratio by the speed switching lever 12.

Figure 18:
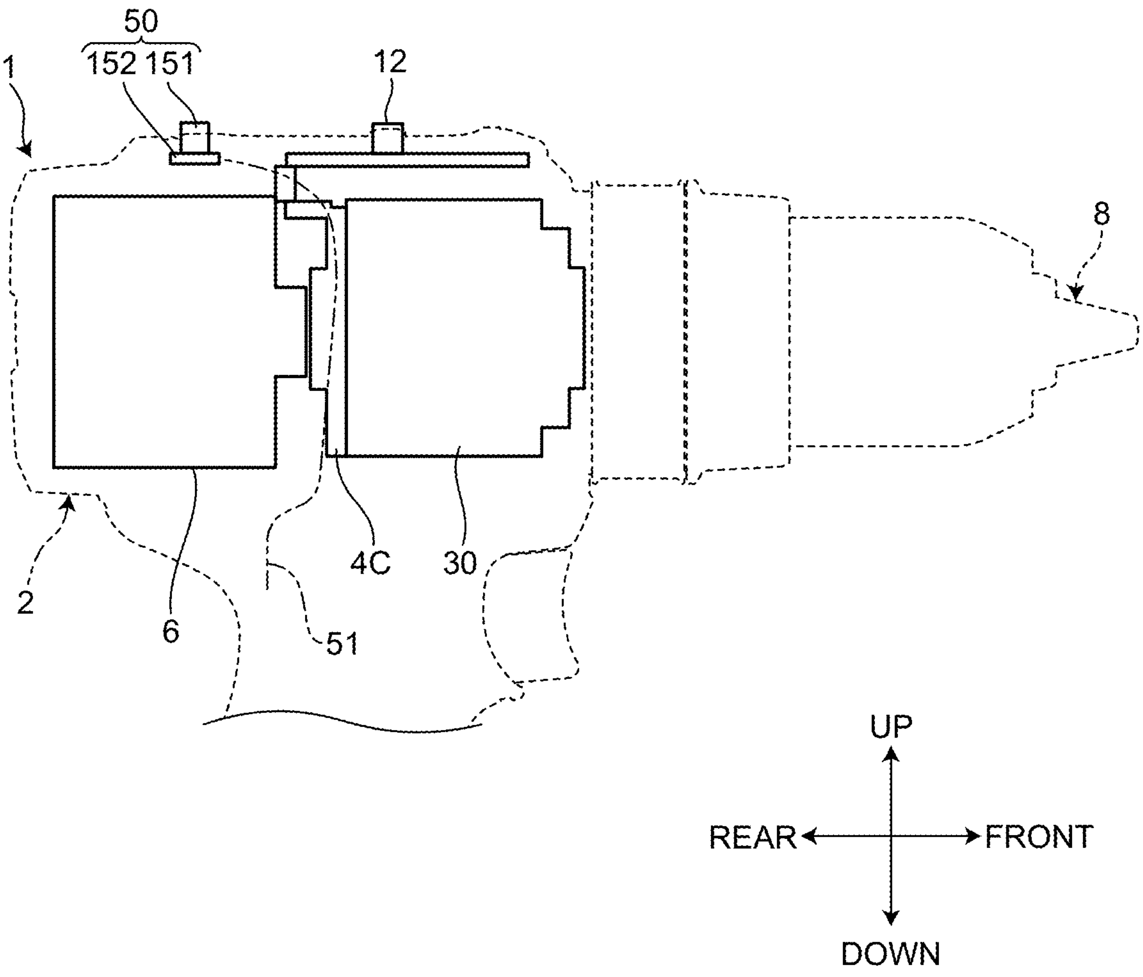
FIG. 18 is a schematic diagram illustrating an element according to another embodiment.
Figure 19:
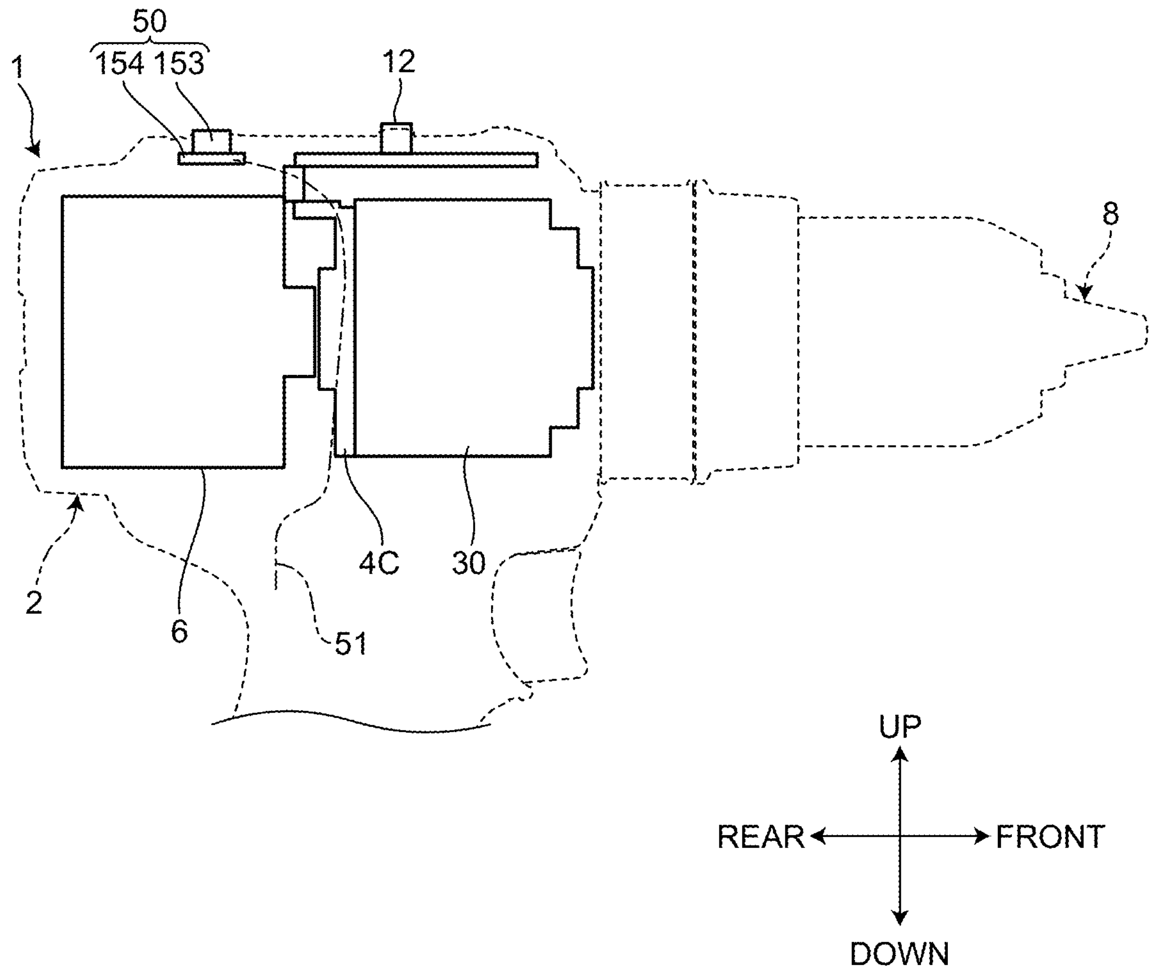
FIG. 19 is a schematic diagram illustrating the element according to another embodiment.

FIGS. 18 and 19 are schematic diagrams illustrating an element 50 according to another embodiment. In FIGS. 18 and 19, the external shape of the driver drill 1 (housing 2) is indicated by a dotted line, while the motor 6, the motor bracket 4C, the speed reduction mechanism 30, the speed switching lever 12, and the element 50 are indicated by solid lines. The lead wire 51 is indicated by a two-dot chain line.

In FIG. 18, the element 50 includes a notification lamp that notifies the driving state of the motor 6. The element 50 includes a light emitting part 151 and a circuit board 152. The light emitting part 151 includes a light-emitting diode (LED) element, for example. The light emitting part 151 emits light by power supply via the lead wire 51. The light emitting part 151 is exposed from an upper portion of the housing 2 or is visible through a translucent window member provided at the upper portion of the housing 2. The element 50 may include a plurality of the light emitting parts 151. For example, the controller 17 turns on the notification lamp while the motor 6 is rotating. The controller 17 changes lighting states of the notification lamp between when the motor 6 rotates in one direction and when the motor 6 rotates in the other direction, for example. Changing the lightning states includes using different light emission color, using different lighting (blinking) interval, or changing the light emitting parts 151 to emit light, for example. For example, when the electric current value of the motor 6 exceeds a threshold, the controller 17 turns on the notification lamp.

The element 50 is provided above the motor 6. Also in this case, the lead wire 51 is connected to the element 50 through the passage LP (refer to FIG. 11) between the motor 6 and the speed reduction mechanism 30 in the front-rear direction. The lead wire 51 is sandwiched between the housing 2 and the motor bracket 4C and held by the motor bracket 4C.

As described above, in the embodiment, the element 50 includes the notification lamp that notifies the driving state of the motor 6. With the above configuration, the lead wire 51 connected to the notification lamp is appropriately held.

In FIG. 19, element 50 includes an operation switch that receives an operation input. The element 50 includes an input part 153 and a circuit board 154. The input part 153 includes an input device that receives an operation input. The input device can be a button switch, other mechanical switches, a touch sensor, a non-contact proximity sensor, or the like. The input part 153 outputs a signal corresponding to the operation input to the controller 17 via the lead wire 51. The input part 153 is exposed from an upper portion of the housing 2 or can be operated through a window member provided at the upper portion of the housing 2. The element 50 may include a plurality of the input parts 153. The controller 17 receives an operation of changing the mode of the driver drill 1 via an operation switch, for example. The controller 17 switches the operating mode of the motor 6, for example, according to the operation input. The controller 17 changes the maximum torque value of the motor 6 according to the switching to the operating mode. The controller 17 changes the maximum rotation speed of the motor 6 according to the switching to the operating mode. The operation device 24 and the display device 25 such as the interface panel 15 of the above-described embodiment may be provided as the element 50 of FIG. 19.

The element 50 is provided above the motor 6. Also in this case, the lead wire 51 is connected to the element 50 through the passage LP (refer to FIG. 11) between the motor 6 and the speed reduction mechanism 30 in the front-rear direction. The lead wire 51 is sandwiched between the housing 2 and the motor bracket 4C and held by the motor bracket 4C.

In the embodiment, the element 50 may include an operation switch that receives an operation input. With the above configuration, the lead wire 51 connected to the operation switch is appropriately held.

In the above-described embodiment, the lead wire 51 is sandwiched between the motor bracket 4C and the housing 2 (left housing 2L). The lead wire 51 need not be sandwiched between the motor bracket 4C and the housing 2 (left housing 2L).

Figure 20:
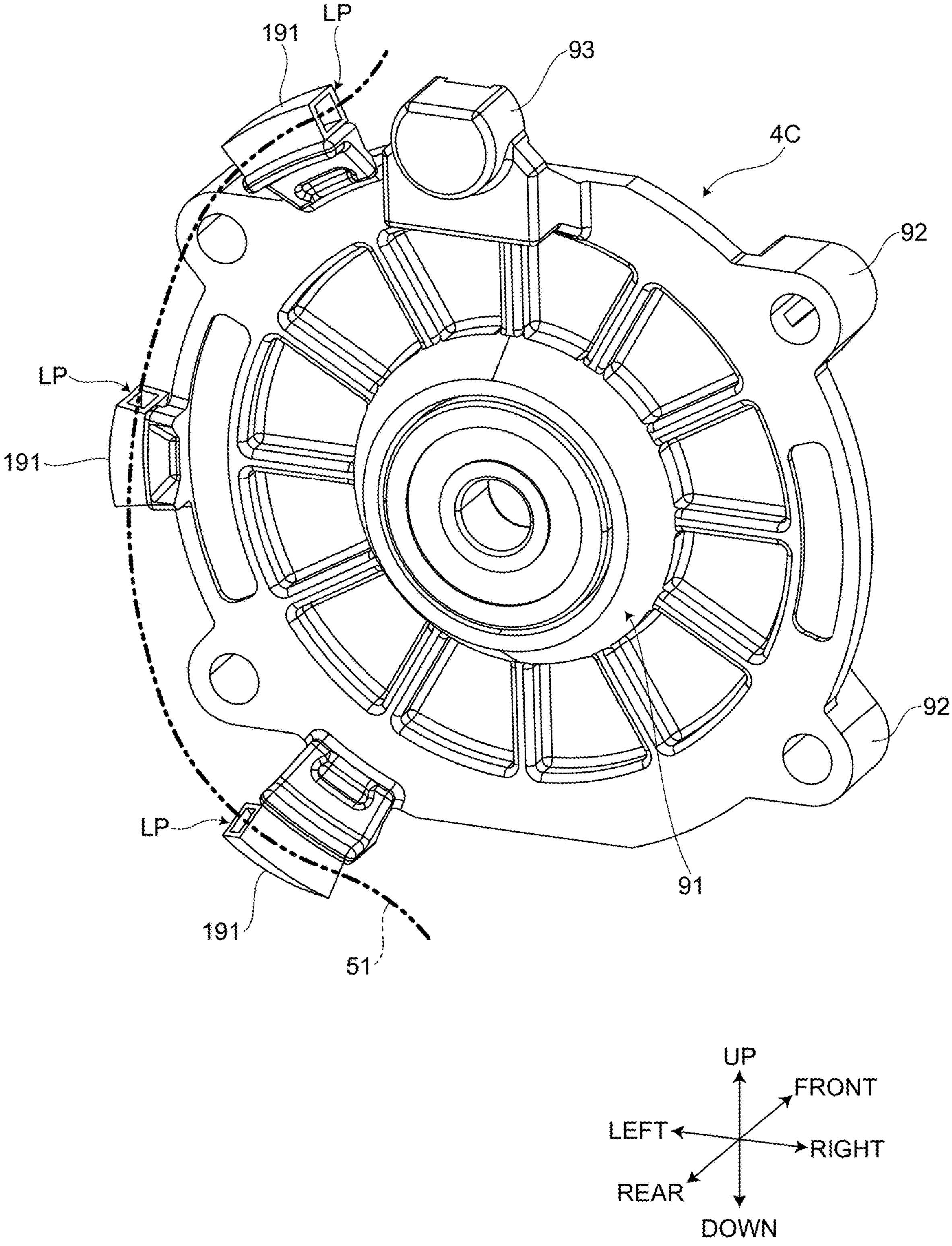
FIG. 20 is a perspective view illustrating a motor bracket according to another embodiment.

FIG. 20 is a perspective view illustrating a motor bracket according to another embodiment. In FIG. 20, the lead wire 51 is indicated by a two-dot chain line. In FIG. 20, the motor bracket 4C is provided with a passage LP. The motor bracket 4C includes tubular portions 191 being a passage of the lead wire 51 on the outer circumferential portion in the left direction. Both ends of each of the tubular portions 191 are opened, and the tubular portions 191 each have an internal space penetrating in the circumferential direction of the motor bracket 4C. Three tubular portions 191 are disposed corresponding to the first protrusion 94 and the two second protrusions 95 illustrated in FIG. 12. These three tubular portions 191 constitute the passage LP through which the lead wire 51 passes. In FIG. 20, the lead wire 51 is held by the motor bracket 4C.

Figure 21:
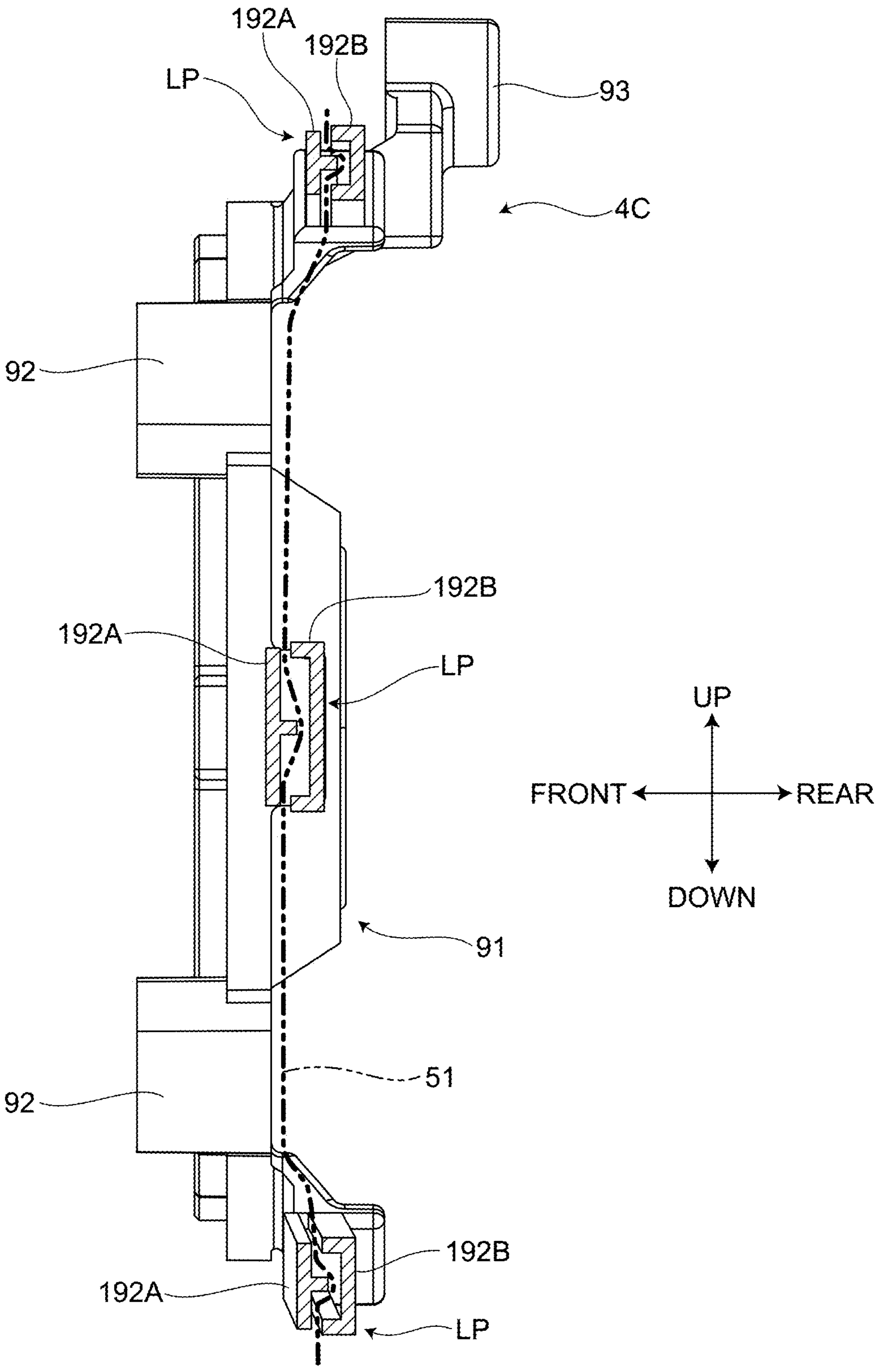
FIG. 21 is a left side view illustrating a motor bracket according to another embodiment.

FIG. 21 is a left side view illustrating a motor bracket according to still another embodiment. In FIG. 21, the lead wire 51 is indicated by a two-dot chain line. In FIG. 21, the motor bracket 4C has a passage LP. The motor bracket 4C includes, on the outer circumferential portion on the left side, the passage LP constituted with pairs of walls 192A and 192B. The pairs of walls 192A and 192B protrude outward in the radial direction from the outer circumferential portion of the motor bracket 4C. The walls 192A and 192B in each pair face each other spaced apart from each other in the front-rear direction. Gaps between the walls 192A and 192B constitute the passage LP. The size of the gap between the walls 192A and 192B in each pair (that is, the width of the passage LP) is set to a width suitable for holding the lead wire 51. Each of the walls 192A has a protruding wall protruding toward the wall 192B at an intermediate position of the passage LP. Each of the walls 192B has a recess recessed in a direction away from the wall 192A (to the rear) at least at a corresponding position with respect to the protruding wall of the wall 192A. The passage LP has a curved shape due to the protruding wall of the wall 192A and the recess of the wall 192B. The lead wire 51 is inserted through the passage LP having the curved shape. The lead wire 51 is curved in the passage LP, thereby increasing frictional resistance between the lead wire 51 and the walls 192A and 192B. Accordingly, the lead wire 51 is fixed in the passage LP. Since the pairs of walls 192A and 192B protrude outward in the radial direction, the passage LP is open outward in the radial direction. The open portion of the passage LP is covered by the inner surface of the housing 2 (left housing 2L), thereby suppressing of removal of the lead wire 51 from the passage LP. Three pairs of walls 192A and 192B are disposed corresponding to the first protrusion 94 and the two second protrusions 95 illustrated in FIG. 12. In FIG. 20, the lead wire 51 is held by the motor bracket 4C.

In the above-described embodiment and the modifications of FIGS. 20 and 21, the lead wire 51 is passed between the left side surface of the motor bracket 4C and the left housing 2L. The lead wire 51 may pass between the right side surface of the motor bracket 4C and the right housing 2R.

In the embodiment described above, the passage LP between the motor 6 and the speed reduction mechanism 30 is provided between the motor bracket 4C and the housing 2. The passage LP between the motor 6 and the speed reduction mechanism 30 may be provided in a member other than the motor bracket 4C. For example, a member for forming the passage LP through which the lead wire 51 passes may be added between the motor 6 and the motor bracket 4C.

According to the technology disclosed in the present specification, it is possible to appropriately hold the lead wire connected to the element while suppressing an increase in external dimension.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driver drill comprising:
- a motor;
- an output part provided forward of the motor and driven by the motor;
- a speed reduction mechanism disposed between the motor and the output part;
- a motor bracket disposed between the motor and the speed reduction mechanism;
- a housing that houses the motor and the motor bracket;
- an element provided above the motor or the speed reduction mechanism; and
- a lead wire connected to the element and extending more downward than the motor or the speed reduction mechanism, wherein
- the lead wire is sandwiched between the housing surrounding an outer circumference of the motor bracket and the motor bracket.

2. The driver drill according to claim 1, further comprising
- a hammer mechanism that hammers the output part.

3. The driver drill according to claim 1, wherein
- the speed reduction mechanism is a multi-stage speed changer,
- the driver drill further comprises a speed switching lever that is disposed in an upper portion of the housing and that is operable by a user to switch a speed reduction ratio of the speed reduction mechanism, and
- the element includes a sensor that detects the switching of the speed reduction ratio in response to the speed switching lever being operated.

4. The driver drill according to claim 1, wherein
- the element includes a notification lamp that notifies a driving state of the motor.

5. The driver drill according to claim 1, wherein
- the element includes an operation switch that receives an operation input.

6. A driver drill comprising:
- a motor;
- an output part provided forward of the motor and driven by the motor;
- a speed reduction mechanism disposed between the motor and the output part;
- a motor bracket disposed between the motor and the speed reduction mechanism;
- a housing that houses the motor and the motor bracket;
- an element provided above the motor or the speed reduction mechanism; and
- a lead wire connected to the element and extending more downward than the motor or the speed reduction mechanism, wherein
- the lead wire is sandwiched between the housing and the motor bracket,
- the housing has, on an inner surface of the housing, a recess in which the lead wire is disposed, and
- the motor bracket has, on an outer circumference of the motor bracket, a protrusion protruding toward the recess.

7. The driver drill according to claim 6, wherein
- the protrusion includes a first protrusion and a second protrusion arranged in a circumferential direction of the motor bracket, and
- in a radial direction of a rotation axis of the motor, a distance from the rotation axis to a leading end of the first protrusion is shorter than a distance from the rotation axis to a leading end of the second protrusion.

8. The driver drill according to claim 7, wherein
- the first protrusion is disposed on a side surface of the motor bracket, and
- the second protrusion is disposed, on the motor bracket, more upward or downward than the first protrusion.

9. A hammer driver drill comprising:

a motor;

an output part provided forward of the motor and driven by the motor;

a speed reduction mechanism disposed between the motor and the output part;

a hammer mechanism disposed between the output part and the speed reduction mechanism;

a motor bracket disposed between the motor and the speed reduction mechanism so as to position the motor and the speed reduction mechanism;

a housing that houses the motor and the speed reduction mechanism;

an element provided above the motor and the speed reduction mechanism; and a controller provided downward of the motor and connected to the element via a lead wire, wherein a passage through which the lead wire passes is provided between the motor and the speed reduction mechanism in a front-rear direction, and the passage is provided between the motor bracket and the housing surrounding an outer circumference of the motor bracket.

10. The hammer driver drill according to claim 9, the speed reduction mechanism is a multi-stage speed changer, the driver drill further comprises a speed switching lever that is disposed in an upper portion of the housing and that is operable by a user to switch a speed reduction ratio of the speed reduction mechanism, and the element includes a sensor that detects the switching of the speed reduction ratio in response to the speed switching lever being operated.

11. The hammer driver drill according to claim 9, wherein the element includes a notification lamp that notifies a driving state of the motor.

12. The hammer driver drill according to claim 9, wherein the element includes an operation switch that receives an operation input.

* * * * *